(12) United States Patent
Schaap et al.

(10) Patent No.: US 10,928,545 B2
(45) Date of Patent: Feb. 23, 2021

(54) GAMMA-RAY ATTENUATOR AND GAMMA-RAY SHIELD FOR GAMMA-RAY SPECTROSCOPY

(71) Applicant: Curium US LLC, St. Louis, MO (US)

(72) Inventors: Bart Schaap, Petten (NL); Sterling Marshall, St. Louis, MO (US)

(73) Assignee: Curium US LLC, St. Louis, MO (US)

( * ) Notice: Subject to any disclaimer, the term of this patent is extended or adjusted under 35 U.S.C. 154(b) by 0 days.

(21) Appl. No.: 16/406,680

(22) Filed: May 8, 2019

(65) Prior Publication Data

US 2019/0346587 A1 Nov. 14, 2019

Related U.S. Application Data

(60) Provisional application No. 62/668,669, filed on May 8, 2018.

(51) Int. Cl.

| G01V 5/12 | (2006.01) |
| G01V 5/08 | (2006.01) |
| G01T 1/16 | (2006.01) |
| G01T 1/163 | (2006.01) |

(52) U.S. Cl.
CPC ............. *G01V 5/12* (2013.01); *G01T 1/163* (2013.01); *G01T 1/1603* (2013.01); *G01V 5/085* (2013.01)

(58) Field of Classification Search
CPC ......... G01T 1/1603; G01T 1/163; G01T 7/02; G01V 5/085; G01V 5/12
See application file for complete search history.

(56) References Cited

U.S. PATENT DOCUMENTS

| 7,049,602 B2 | 5/2006 | Tokhtuev | |
| 2014/0131584 A1* | 5/2014 | Stagg | B29C 65/8253 |
| | | | 250/370.06 |
| 2017/0146669 A1 | 5/2017 | Dai et al. | |

FOREIGN PATENT DOCUMENTS

GB 2530254 A 3/2016

OTHER PUBLICATIONS

International Search Report and Written Opinion dated Jul. 30, 2019 for PCT/US19/31299, 10 pages.

* cited by examiner

*Primary Examiner* — Mark R Gaworecki
(74) *Attorney, Agent, or Firm* — Polsinelli PC

(57) ABSTRACT

The present disclosure provides a gamma-ray attenuator and a gamma-ray shield for use in gamma-ray spectroscopy. The gamma-ray attenuator is a sleeve comprising a wall, a distal end, and a proximal end. The distal end of the sleeve is closed, and the proximal end of the sleeve forms an opening. A copper insert, a tin insert and a tungsten insert are installed in the sleeve such that the copper insert is adjacent to the distal end and the tungsten insert is closest to the proximal end. The sleeve is comprised of one or more materials that do not substantially attenuate gamma-rays. The open end of the sleeve fits over a tungsten safe that is operable to hold a radionuclide sample. When fitted together, a gamma-ray attenuator and a safe comprise a gamma-ray shield.

20 Claims, 16 Drawing Sheets

US 10,928,545 B2

GAMMA-RAY ATTENUATOR AND GAMMA-RAY SHIELD FOR GAMMA-RAY SPECTROSCOPY

CROSS REFERENCE TO RELATED APPLICATIONS

This application claims priority to U.S. Provisional Application No. 62/668,669, filed May 8, 2018, the disclosures of which are incorporated herein by reference.

FIELD

The present disclosure is directed to a gamma-ray attenuator and a gamma-ray shield for use in gamma-ray spectroscopy, in particular radionuclide identification and radionuclidic purity measurements.

BACKGROUND

Most radioactive sources produce gamma rays of various energies and intensities. When these emissions are detected and analyzed with a spectroscopy system, a gamma-ray energy spectrum can be produced. A detailed analysis of this spectrum is typically used to determine the identity and quantity of gamma emitters present in the radioactive source. These concepts, radionuclide identification and radionuclidic purity, are particularly important in nuclear medicine, since any radionuclidic impurity may increase the radiation dose received by a patient, result in the unintentional targeting of secondary sites in the patient's body, and/or degrade the quality of any imaging or therapeutic procedure performed.

In many applications, the gamma rays of interest can be measured more easily if lower energy gamma rays can be absorbed before they reach the detector. For accurate, reliable and repeatable radioactivity measurements, the rate of gamma rays incident on the gamma ray spectrometer should be reasonably low. Selective removal of lower energy gamma rays, for example by a gamma-ray attenuator, can prevent significant count-related losses in the detector and spectral distortion, which would otherwise negatively impact the identification and measurement of radionuclides in a sample. In particular, one use for a gamma-ray attenuator is when a product radionuclide typically comprises 90%, 95% or 99% or more of the total radioactivity of a drug product and the gamma rays of the product radionuclide have lower energies than the gamma rays of the radionuclidic impurities.

A gamma-ray attenuator routinely used in the art since 1984 is the gamma attenuator pack No. 3 produced by the U.S. Department of Commerce's National Bureau of Standards. The pack consists of a stack of foils—3 gold foils, 1 copper foil, and 1 cadmium foil. The foils are epoxied together and enclosed in a heat sealed polyethylene bag.

BRIEF DESCRIPTION OF THE FIGURES

The application file contains at least one photograph executed in color. Copies of this patent application publication with color photographs will be provided by the Office upon request and payment of the necessary fee.

The examples herein may be better understood by referring to the following description in conjunction with the accompanying drawings in which like reference numerals indicate analogous, identical, or functionally similar elements. Understanding that these drawings depict only examples of the disclosure and are not therefore to be considered to be limiting of its scope, the principles herein are described and explained with additional specificity and detail through the use of the accompanying drawings in which.

DETAILED DESCRIPTION

Figure 1:
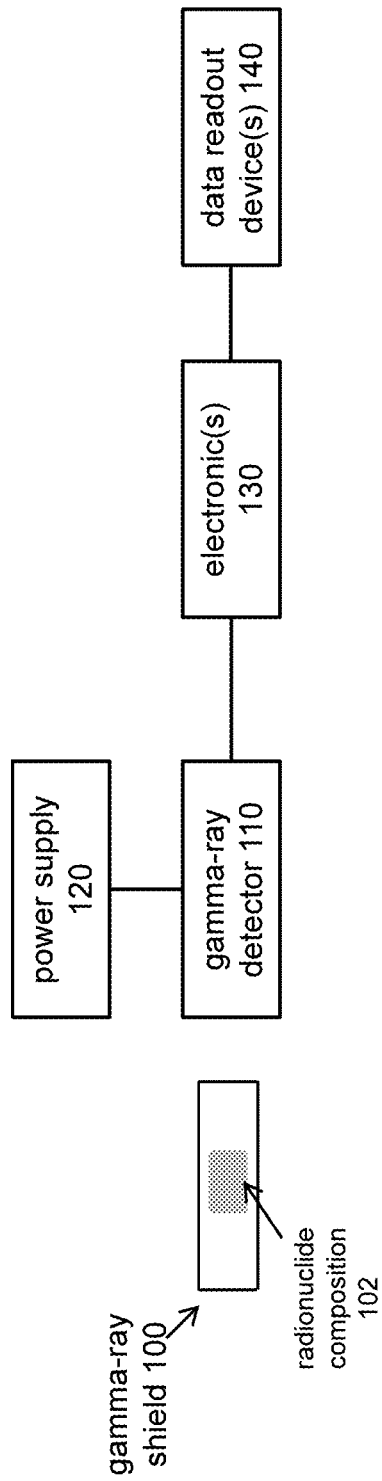
FIG. 1 is a schematic diagram depicting an environment in which a gamma-ray shield of the present disclosure may be implemented.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

The present disclosure is directed to a gamma-ray attenuator and a gamma-ray shield for use in gamma-ray spectroscopy, in particular radionuclide identification and radionuclidic purity measurements. Various examples of a gamma-ray shield of the present disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Several definitions that apply throughout this disclosure will now be presented. "Coupled" refers to the linking or connection of two objects. The coupling can be direct or indirect. An indirect coupling includes connecting two objects through one or more intermediary objects. Coupling can also refer to electrical or mechanical connections. Coupling can also include magnetic linking without physical contact. The term "comprising" means "including, but not necessarily limited to"; it specifically indicates open-ended inclusion or membership in a so-described combination, group, series and the like. The terms "comprising" and "including" as used herein are inclusive and/or open-ended and do not exclude additional, unrecited elements or method processes. The use of relational terms such as, but not limited to, "down," "downward," "up," "upward," "above," "below," and "side," are used in the description for clarity in specific reference to the figures and are not intended to limit the scope of the present inventive concept or the appended claims. "Proximate" refers to a point or position located a short distance away. For example, proximate an end means that the point or position is located within a short distance from the end but is not at the end itself. "Substantially" refers to an element essentially conforming to the particular dimension, shape, or other word that substantially modifies, such that the component need not be exact. For example, substantially cylindrical means that the object resembles a cylinder, but can have one or more deviations from a true cylinder. As used herein, "about" refers to numeric values, including whole numbers, fractions, percentages, etc., whether or not explicitly indicated. The term "about" generally refers to a range of numerical values, for instance, ±0.5-1%, ±1-5% or ±5-10% of the recited value, that one would consider equivalent to the recited value, for example, having the same function or result. In some instances, the term "about" may include numerical values that are rounded to the nearest significant figure.

A gamma-ray attenuator is a device that absorbs gamma ray energy emitted from a radioactive sample. When placed between a radioactive source and a detector, a gamma-ray attenuator reduces the gamma radiation detectable on the side opposite the radioactive source. A gamma-ray attenuator of the present disclosure refers to a sleeve comprising three metal inserts with decreasing proton number installed within the sleeve, as described in further detail below. In operation, a gamma-ray attenuator is positioned relative to a radioactive sample such that the metal insert with the lowest proton number is closest to the radioactive sample.

A gamma-ray attenuator of the present disclosure is designed to be fit over a radiation safe that is open on one end and operable to hold a radioactive sample or a container comprising a radioactive sample. When fitted together, a gamma-ray attenuator and a radiation safe comprise "a gamma-ray shield" of the present disclosure.

A gamma-ray attenuator of the present disclosure and a radiation safe of the present disclosure are structurally different. Compared to the composition of a gamma-ray attenuator, the composition of a radiation safe provides a greater reduction of gamma rays of all energies in order to reduce the local environment's overall exposure to gamma radiation. Generally speaking, selection of the composition (for example, materials of high density and high atomic number, such as tungsten, lead, etc., as an alloy or as a pure composition) and thickness of the materials influence the attenuation achieved by a gamma-ray attenuator or a radiation safe. While the shield and attenuator of the present disclosure are referred to as a "gamma-ray attenuator" and a "gamma-ray shield," one of skill in the art will appreciate that other radiation energies will also be reduced if present, for example, alpha, beta, and x-ray radiation.

A gamma-ray shield of the present disclosure may optionally comprise a container suitable for holding a radionuclide composition. Non-limiting examples of suitable containers include vials, flasks, and bottles of various sizes and shapes. In various examples, a radionuclide composition can comprise one or more radionuclides used in nuclear medicine and optionally one or more diluent. Suitable diluents for radionuclides used in nuclear medicine are well-known in the art. Radionuclides used in nuclear medicine include, are but not limited to, actinium, bismuth, boron, caesium, fluorine, germanium, iodine, iridium, lead, lutetium, molybdenum, palladium, phosphorus, radium, samarium, strontium, rhenium, thallium, technetium, xenon, and yttrium. Generally, no radionuclide sample is 100% pure. Radionuclide samples contain some amount of impurities arising from the production process and/or the decay of the primary radioisotope. The total radioactivity of all radionuclidic impurities in a sample is equal to the total radioactivity of the sample less the radioactivity of the desired radionuclide. As recognized in this disclosure, it is important to know not only the total radioactivity of all radionuclidic impurities, but also, the amounts of specific impurities.

In at least one example, a radionuclide composition comprises xenon-133 and optionally one or more diluent. Non-limiting examples of suitable diluents include $CO_2$, air, and carrier xenon gas. Common radionuclidic impurities in xenon-133 compositions include, but are not limited to, xenon-133m, xenon-131m, krypton-85, iodine-131, caesium-137, barium-140, and zirconium-95. The amount of xenon-133 can and will vary. In some examples, a radionuclide composition comprises at least about 2 µCi of total radioactivity. In other examples, a radionuclide composition comprises at least about 200 µCi of total radioactivity. In other examples, a radionuclide composition comprises at least about 400 µCi of total radioactivity. In other examples, a radionuclide composition comprises at least about 800 µCi of total radioactivity. In other examples, a radionuclide composition comprises at least about 1000 µCi of total radioactivity. In other examples, a radionuclide composition comprises at least about 2000 µCi of total radioactivity. In other examples, a radionuclide composition comprises at least about 4000 µCi of total radioactivity. In other examples, a radionuclide composition comprises at least about 10,000 µCi of total radioactivity. In other examples, a radionuclide composition comprises at least about 20,000 µCi of total radioactivity. In other examples, a radionuclide composition comprises about 4000 to about 20,000 µCi of total radioactivity. In other examples, a radionuclide composition comprises about 4000 to about 10,000 µCi of total radioactivity. In other examples, a radionuclide composition comprises about 10,000 to about 20,000 µCi of xenon-133. In each of the above examples, total radionuclidic impurities in the composition can be about 5% or less, about 1% or less, about 0.5% or less, or about 0.1% or less.

A gamma-ray attenuator or a gamma-ray shield of the present disclosure is operable for use in gamma-ray spectroscopy. Gamma-ray spectroscopy is a method used for radionuclide identification and/or radionuclidic purity measurement. Another aspect of the present disclosure is system comprising a gamma-ray shield of the present disclosure further comprising a container in the well of the safe, wherein the container comprises a radionuclide composition; and a gamma spectroscopy system comprising a gamma spectroscopy detector. A gamma spectroscopy system can further comprise at least one power supply; a pulse sorter or multichannel analyzer; at least one amplifier; at least one data readout device to generate, display, and store the spectrum or combination of devices to generate, display, and store the spectrum; at least one rate meter, at least one peak position stabilizer, or any combination thereof. Suitable gamma spectrometry detectors are known in the art. Non-limiting examples include scintillation detectors and high purity germanium (HPGe) detectors.

FIG. 1 is a schematic diagram depicting an environment in which a gamma-ray shield 100 of the present disclosure comprising a radionuclide composition 102 may be implemented for use in gamma-ray spectroscopy. Gamma-ray shield 100 is aligned with a gamma-ray detector 110, which is coupled to one or more power supplies 120. One or more electronics 130 are also coupled to gamma-ray detector 120 and process signals produced by gamma-ray detector 120. Electronics typically used in gamma-ray spectroscopy may include, but are not limited to, a pulse sorter or multichannel analyzer, associated amplifiers, and data readout devices (shown as 140) to generate, display, and store the spectrum, which may be used in any combination. Other electronics, such as rate meters and peak position stabilizers, may also be used. The electronics 130 can include a processor and a non-transitory memory configured to store one or more instructions for execution by the processor. Additional storage devices can be included such as a solid state storage device, a hard disk, and a removable memory device. The data readout devices can include one or more display devices, such as a monitor, a single line counter, and a light. The data readout devices can also include a printer. Still further the data readout devices can include a speaker that provides audio regarding the data.

Although FIG. 1 depicts an environment in which a gamma-ray shield is implemented, in other examples, a gamma-ray attenuator need not be fitted over a radiation safe to have utility. The design of a gamma-ray shield of the present disclosure reduces levels of gamma radiation in all directions, thereby reducing the radiation exposure of associated personnel, shielding equipment in the environment, and streamlining quality control procedures. Nonetheless, in a fully automated environment or other situations, use of a gamma-ray attenuator of the present disclosure with a radiation safe may not be needed.

In many applications, measurements needed for radionuclide identification and analysis of radionuclidic purity can be made more easily if lower energy gamma rays can be absorbed before they reach the gamma-ray detector. Selective removal of lower energy gamma rays can prevent significant count-related losses in the detector and spectral distortion, which would otherwise negatively impact the identification and measurement of radionuclides in a sample. Radionuclide identification of Xe-133 and determination of radionuclidic purity in a Xe-133 sample can be used to illustrate this concept.

Xe-133 is produced by fission of uranium. Common impurities captured with Xe-133 include, but are not limited to, Kr-85, Xe-131m, Xe-133m, I-131, Cs-137, Ba-140, and Zr-95. Radionuclide identification of Xe-133 per the current U.S. Pharmacopeia is by location of the 31 keV (X-ray) and the 81 keV (gamma-ray) peaks in the collected energy spectrum. However, when a composition comprising Xe-133 is intended for nuclear medicine, radionuclidic purity must also be determined. Xe-133 used for nuclear medicine often has stringent purity requirements. For example, Tables A and B below are acceptance criteria proposed for Xe-133 gas drug substance and Xe-133 gas drug product.

TABLE A

Acceptance Criteria for Tests to be Performed to Demonstrate the Quality of a Xenon Xe-133 Gas Drug Substance

| | Test | Acceptance Criteria |
|---|---|---|
| 1. | Appearance | Clear colorless gas |
| 2. | Radionuclide Identification | Major photo peaks at 81 keV and 31 keV (X-ray) |
| 3. | Radionuclidic Purity | Minimum 99.9% as radioxenons (Xe-133, Xe-133m, and Xe-131m) with less than or equal to 0.6% Xe-133m and less than or equal to 1.0% Xe-131m. All detected radioactive impurities (Kr-85, I-131, and any others) cannot exceed 0.1% with limits of less than or equal to 0.03% Kr-85, less than or equal to 0.01% I-131 and less than or equal to 0.06% for all other impurities. |

TABLE B

Acceptance Criteria for Tests to be Performed to Demonstrate Compatibility and/or Stability of a Xenon Xe-133 Gas Drug Product

| | Test | Acceptance Criteria |
|---|---|---|
| 1. | Appearance | Clear colorless gas |
| 2. | Total Vial Radioactivity | 85.0%-115.0% of labeled value. |
| 3. | Radionuclide Identification | Major photo peaks at 81 keV and 31 keV (X-ray) |
| 4. | Radionuclidic Purity (At Final Product Calibration) | Minimum 99.9% as radioxenons (Xe-133, Xe-133m, and Xe-131m) with Xe-133m less than or equal to 0.3% and Xe-131m less than or equal to 1.5%. All detected radioactive impurities (Kr-85, I-131, and any others) cannot exceed 0.1%, with limitations of Kr-85 less than or equal to 0.06%, I-131 less than or equal to 0.01%, and all other impurities less than or equal to 0.03%. |

A suitable gamma-ray detector for Xe-133 identification and purity analysis is an HPGe detector, though other detectors known in the art may also be used. HPGe detectors are highly sensitive to x-rays and gamma-rays in the range of 3 keV to 1500 keV. The flux of energies (incident concentration of x-rays and gamma to the HPGE crystal) in this range must be relatively low to prevent saturation of the crystal, which if not prevented leads to loss of measurement accuracy and/or loss of measurement linearity. A typical amount of unattenuated radioactivity measured on an HPGe detector at a distance of 10 cm from the detector surface is approximately 2-10 microcuries (µCi) (74 KBq-370 KBq). For a Xe-133 sample, more than 99.9% of the radioactivity is at 81.0 keV and lower. However, identification of potential radionuclidic impurities requires detection of higher energy peaks, for example, Xe-131m at 163.9 keV, Xe-133m at 233.2 keV, Kr-85 at 514.0 keV, etc. Using a typical amount of unattenuated radioactivity suitable for radionuclide identification, it would not be possible to detect all the radionuclidic impurities that could potentially be found in a Xe-133 composition at low levels. In order to be able to identify and accurately report radioactivity attributable to these impurities at a concentration limit of less than 0.1% (as may be required for use in nuclear medicine), orders of magnitude more than 2-10 µCi of radioactivity must be measured on an HPGe detector. However these amounts, if unshielded, would saturate the crystal and the detector would become non-functional. Prior to the present disclosure, the solution was to prepare multiple samples for radionuclide identification and radionuclidic purity measurements.

A gamma-ray shield of the present disclosure provides many advantages over the state of the art. The safe of a gamma-ray shield disclosed herein reduces the low energy gamma-rays of the sample, while allowing transmission to the detector of the high energies of the Xe-133 product (for example, 302.85 keV and 383.85 keV peaks) and of the known or potential radionuclidic impurities (for example, Xe-131m at 163.9 keV, Xe-133m at 233.2 keV, Kr-85 at 514.0 keV, etc.). An advantage of the disclosed gamma-ray shield is that relatively large quantities of radioactivity (for example, at least 400 µCi, at least 500 µCi, at least 1,000 µCi, at least 2,000 µCi, at least 4,000 µCi, at least 10,000 µCi, at least 20,000 µCi, at least 40,000 µCi, at least 60,000 µCi, at least 80,000 µCi, at least 100,000 µCi or more) can be accurately measured, thereby increasing the concentration of impurities in the sample being measured and making it more likely that impurities will be detected and quantified by quality control procedures. Due to the design of the gamma-ray attenuator, another advantage is that a single sample can be used for both radionuclidic purity measurement and radionuclide identification. This streamlines the quality control procedure by eliminating at least one sample preparation step, thus reducing radiation exposure to associated personnel. In addition, whereas the prior-art NIST gamma-ray attenuator pack did not provide complete shielding because it is only positioned between the radioactive sample and the detector, the gamma-ray shield of the present disclosure fully shields the radioactive sample on all sides, reducing unnecessary exposure and eliminating the need for secondary shielding.

Figure 2:
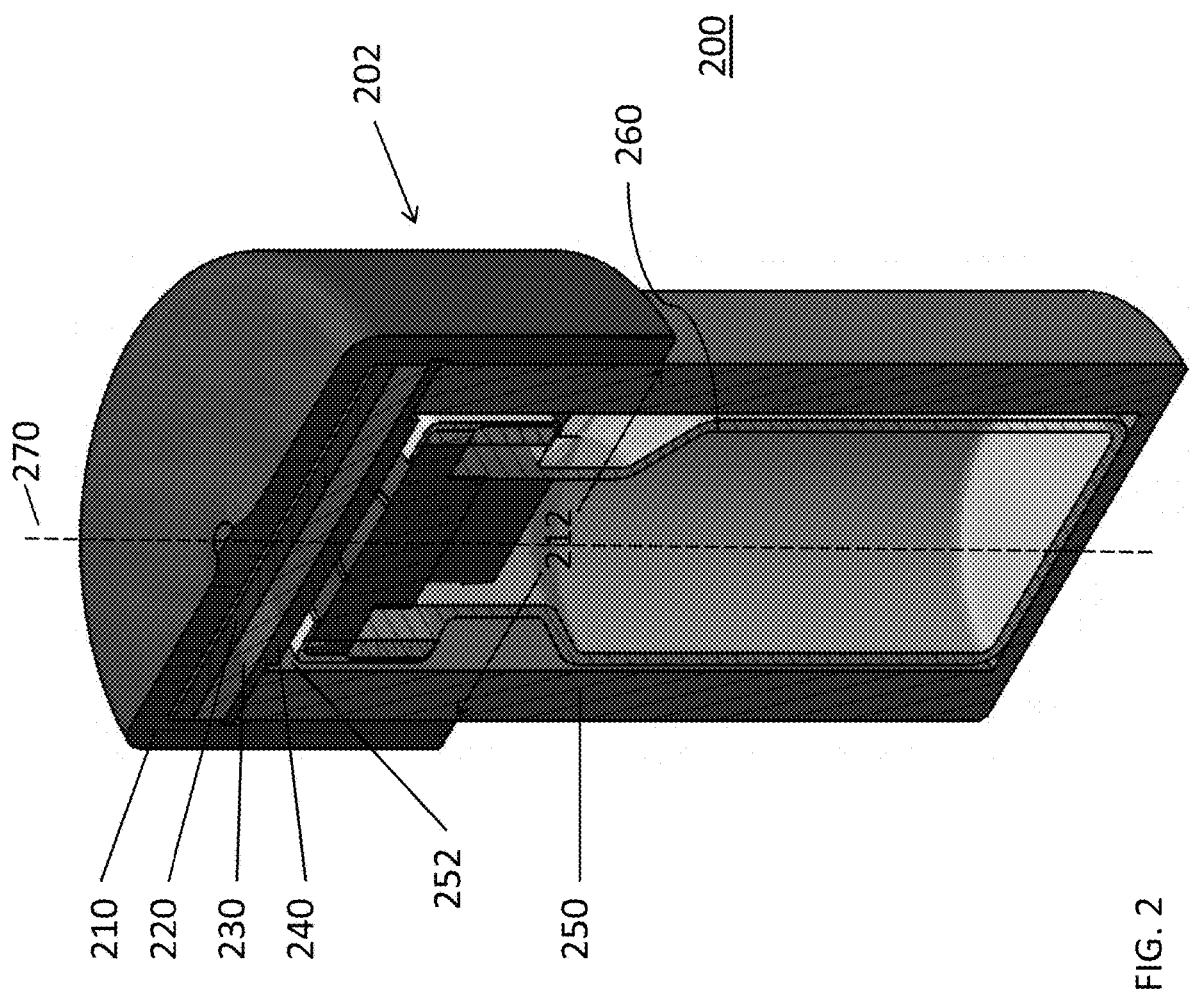
FIG. 2 is an isometric, cross-sectional partial of a gamma-ray shield comprising a container.

FIG. 2 is an isometric, cross-sectional partial of an example of a gamma-ray shield 200 of the present disclosure. A gamma-ray shield 200 can include a sleeve 210, metal insert 220, metal insert 230, metal insert 240, a radiation safe 250, and optionally a container 260. Gamma-ray attenuator 202 of gamma-ray shield 200 is sleeve 210, metal insert 220, metal insert 230 and metal insert 240. The metal of metal insert 240 has a larger proton number than the metal of metal insert 230, and the metal of metal insert 230 has a larger proton number than the metal of metal insert 220. Gamma-ray shield 200 has a longitudinal axis 270 that defines an axial direction. Though not depicted in FIG. 2, metal inserts 220, 230, and 240 each have at least one through hole formed therethrough, such that each insert has the same number of through holes and the through hole(s) on each insert are operable to be aligned with each other. The total diameter of the through holes is directly proportional to the amount of low energy gamma rays that reach a gamma-ray detector. In at least one example, each insert 220, 230, and 240 has a single through hole positioned substantially in the center of the insert 220, 230, and 240. Corresponding through holes may optionally be present in sleeve 210.

In the example illustrated in FIG. 2, sleeve 210, metal inserts 220, 230, and 240, and radiation safe 250 are all substantially cylindrical. Alternative designs are also contemplated provided sleeve 210 fits over open end 252 of radiation safe 250; metal inserts 220, 230, and 240 are operable to be installed within an opening 212 formed by the sleeve 210; and the edges of metal inserts 220, 230, and 240 each extend at least to the wall of sleeve 210. As a non-limiting example, sleeve 210, metal inserts 220, 230 and 240, and radiation safe 250 may be substantially cuboid rather substantially cylindrical. Similarly, while container 260 is shown as a vial, other suitable containers may also be used provided sleeve 210 fits over the open end 252 of radiation safe 250 as shown. Container 260 can hold a radionuclide composition, in at least one example a composition comprising a radionuclide used in nuclear medicine and optionally one or more diluent. Radionuclides used in nuclear medicine are described above. In at least one example, a radionuclide composition comprises xenon-133 and optionally one or more diluent. Non-limiting examples of radionuclide compositions comprising xenon-133 and optionally one or more diluent are also described above.

Figure 3A:
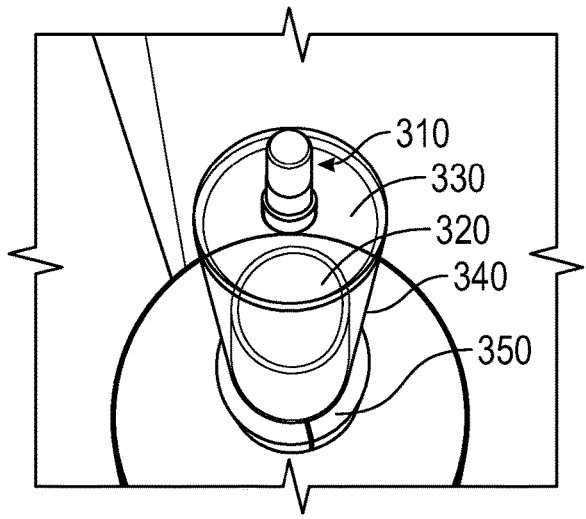
FIG. 3A is a picture illustrating an exemplary gamma-ray shield of the present disclosure placed in a platform attachment for radionuclide identification within the shielding of an HPGe detector.
Figure 3B:
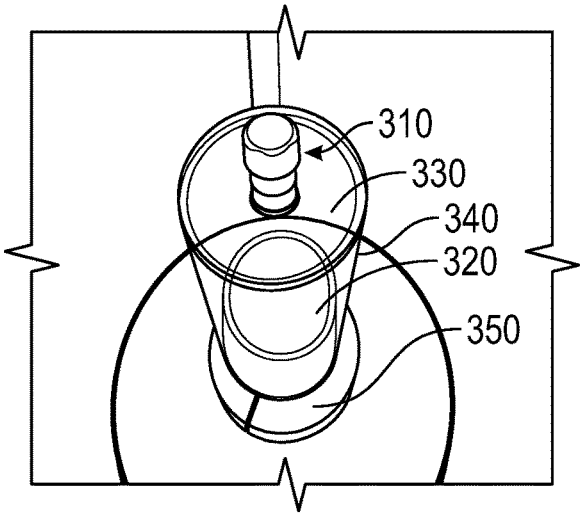
FIG. 3B is a picture inside the shielding of an HPGe detector with an exemplary gamma-ray shield of the present disclosure placed in a platform attachment for radionuclidic impurity measurement.
Figure 3C:
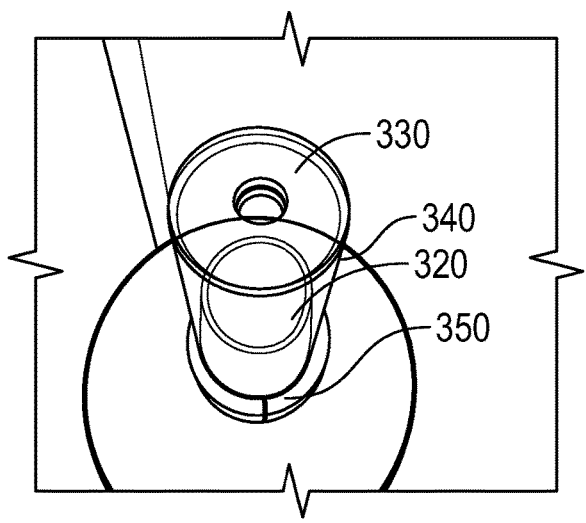
FIG. 3C is a picture illustrating a platform attachment placed on a sample platform within the shielding of an HPGe detector.
Figure 3D:
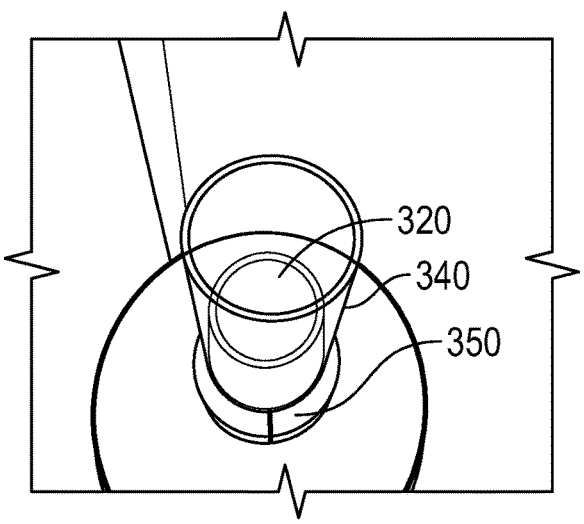
FIG. 3D is a picture illustrating a sample platform positioned over the detector surface, wherein the sample platform is located within the shielding of an HPGe detector.

FIG. 3A and FIG. 3B are photographs of a gamma-ray shield 310 of the present disclosure positioned over an HPGe detector's surface 320. The photographs are taken looking inside the shielding of an HPGe detector. A plexiglass platform attachment 330 sits on a plexiglass platform 340, which collectively retain and center gamma-ray shield 310 over detector's surface 320 during measurement. Platform 340 sits in a depression in platform base 350, and platform base 350 sits on top of pre-amp housing of the detector. In FIG. 3A, gamma-ray shield 310 is placed in platform attachment 330 for radionuclide identification. In FIG. 3B, gamma-ray shield 310 is placed in platform attachment 330 for radionuclidic purity measurement. FIG. 3C is a photograph of platform attachment 330 sitting on platform 340, positioned over an HPGe detector's surface 320 but without a gamma-ray shield 310. FIG. 3D is a photograph of platform 340 positioned over an HPGe detector's surface 320 but without gamma-ray shield 310 and platform attachment 330. Platform base 350 and platform 340 are designed to rest on the detector outer housing so that when the detector moves, the sample platform moves with it, thereby always maintaining an exact geometrical relationship with the detector. This, along with the platform attachment 330, ensures the sample is always centered over the axial center of detector's surface 320 and measurements are consistent. Alternative means for retaining and centering gamma-ray shield 310 over detector's surface 320 are also suitable.

In one example, the present disclosure provides a gamma-ray shield of FIG. 4. FIG. 4A is a diagram of a gamma-ray shield 400 comprising a gamma-ray attenuator 470 comprising a sleeve 410, a copper insert 420, a tin insert 430, and a tungsten insert 440; a radiation safe 450; and a container 460. As described above, the order of inserts 420, 430 and 440 is such that the proton number of the metal inserts increases as the inserts are nearer to radiation safe 450. In the example illustrated in FIG. 4A, sleeve 410, copper insert 420, tin insert 430, tungsten insert 440, and radiation safe 450 are all substantially cylindrical. Alternative designs are also contemplated provided sleeve 410 fits over open end of safe 450; copper insert 420, tin insert 430, and tungsten insert 440 are operable to be installed within the opening of sleeve 410; and the edges of copper insert 420, tin insert 430, and tungsten insert 440 each extend at least to the wall of sleeve 210. As a non-limiting example, sleeve 410, copper insert 420, tin insert 430, tungsten insert 440, and radiation safe 450 may be substantially cuboid rather substantially cylindrical. Similarly, while container 460 is shown as a vial, other suitable containers may also be used provided sleeve 410 fits over the open end of radiation safe 450 as shown. Container 460 can hold a radionuclide composition, in one example a composition comprising a radionuclide used in nuclear medicine and optionally one or more diluent. Radionuclides used in nuclear medicine are described above. In at least one example, a radionuclide composition comprises xenon-133 and optionally one or more diluent. Non-limiting examples of radionuclide compositions comprising xenon-133 and optionally one or more diluent are also described above.

Figure 4A:
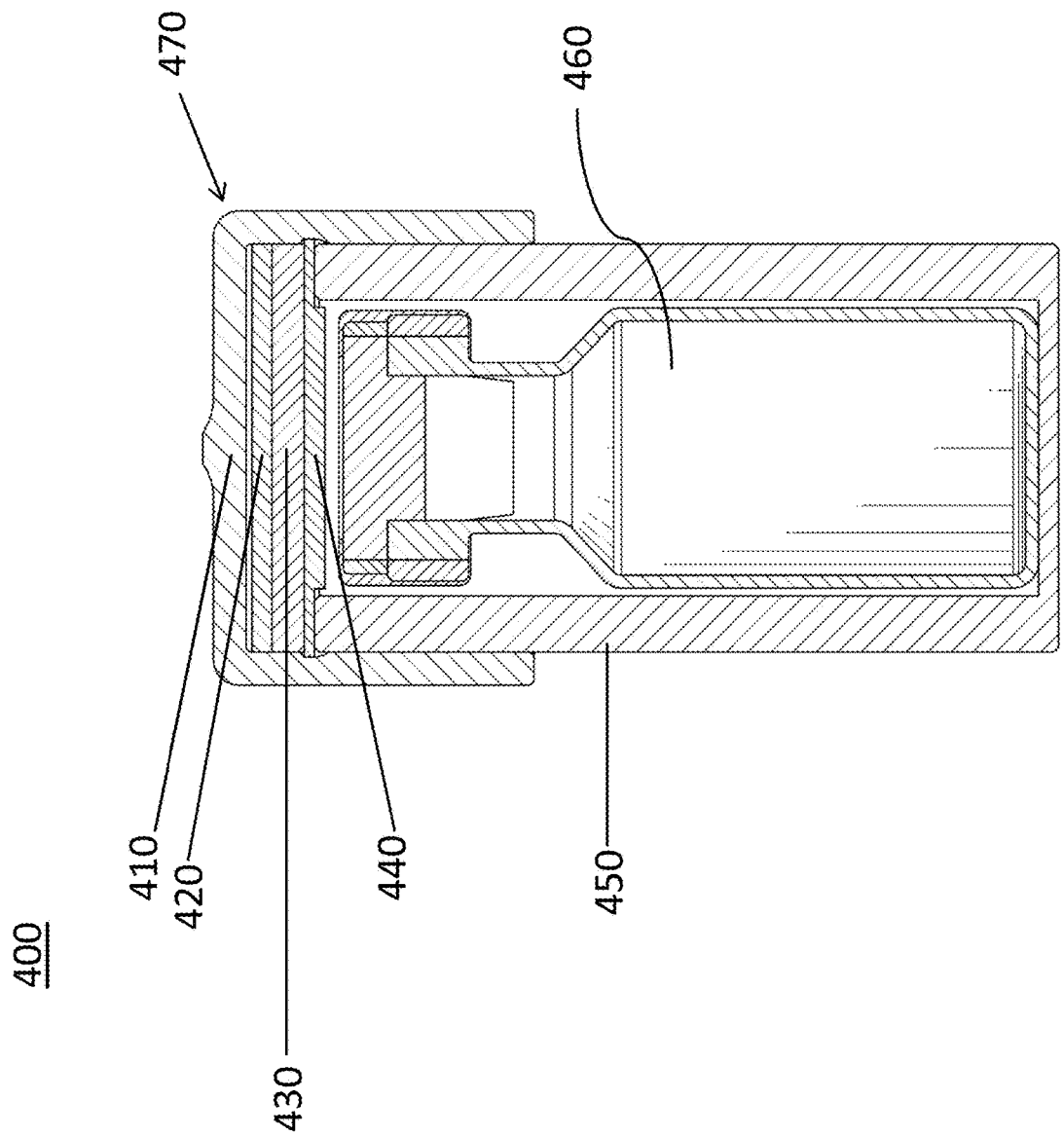
FIG. 4A, FIG. 4B, FIG. 4C, and FIG. 4D diagram various aspects of an example of a gamma-ray shield comprising a 2 mL vial.
Figure 4B:
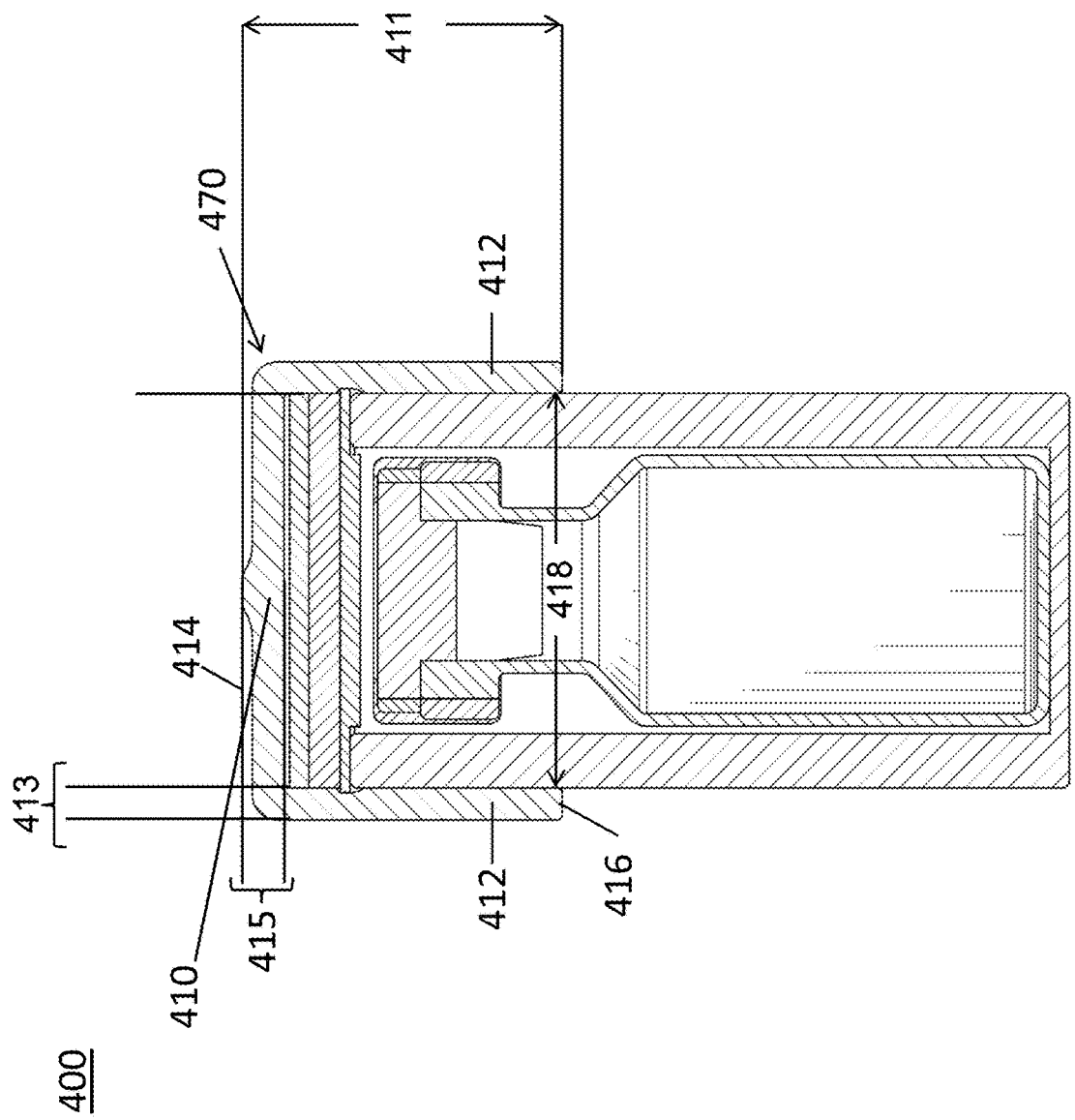

Turning now to FIG. 4B, sleeve 410 has a wall 412, a distal end 414, and a proximal end 416. Distal end 414 of sleeve 410 is closed, and proximal end 416 of sleeve 410 forms an opening 418. In at least one example, the closed distal end 414 of the sleeve is integrally formed with wall 412. Wall 412 has a height, which is measured in the axial direction of sleeve 410, a thickness 413 that can vary. In one example, wall 412 has a height of about 4 millimeters to about 16 millimeters, and a thickness 413 of about 0.5 millimeters to about 5.0 millimeters. In another example, wall 412 has a height 411 of about 8 millimeters to about 16 millimeters measured in the axial direction of sleeve 410 and a thickness 413 of about 1.0 millimeters to about 2.0 millimeters. In another example, wall 412 has a height 411 of about 16.5 millimeters measured in the axial direction of sleeve 410 and a thickness 413 of about 1.5 millimeters. In another example, wall 412 has a height 411 of about 16.25 millimeters measured in the axial direction of sleeve 410 and a thickness 413 of about 1.60 millimeters. Opening 418, which may also be referred to as the inner diameter of sleeve 410, is about 15 millimeters to about 25 millimeters, and in one example about 20 millimeters. Sleeve 410 is comprised of one or more natural or synthetic material that does not substantially attenuate gamma-rays, for example materials with a density that is not higher than the density of tin. Non-limiting examples of suitable materials includes plastics, rubbers, glass, and combinations thereof. In at least one example, sleeve 410 is plastic. In at least one other example, sleeve 410 is rubber. The rubber may be a natural rubber or a synthetic rubber.

Figure 4C:
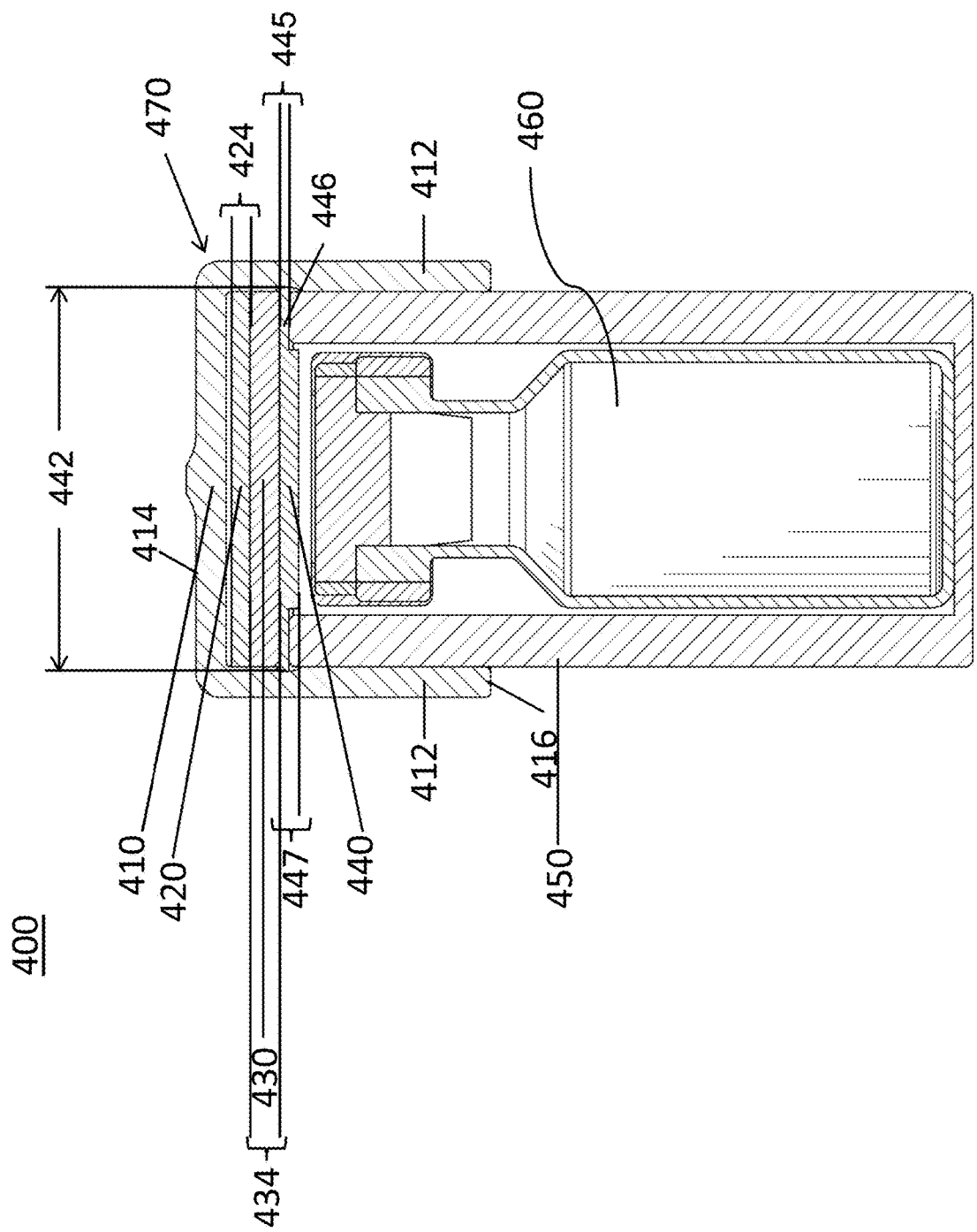

Referring now to FIG. 4C, copper insert 420 is installed within opening 418 formed by proximal end 416 of sleeve 410 so that copper insert 420 substantially abuts distal end 414. Tin insert 430 is installed within opening 418 formed by proximal end 416 of sleeve 410 so that tin insert 430 substantially abuts copper insert 420 on the side opposite sleeve 410. Tungsten insert 440 is installed within opening 418 formed by proximal end 416 of sleeve 410 so that tungsten insert 440 substantially abuts tin insert 430 on the side opposite copper insert 420. Copper insert 420, tin insert 430, and tungsten insert 440 can be installed such that they are or are not removable after installation. In operation, tungsten insert 440 is closest to container 460, which can contain a radionuclide composition. Although in FIG. 4A-D copper insert 420, tin insert 430, and tungsten insert 440 are illustrated such that they substantially abut each other, the distance between the inserts may vary. Similarly, copper insert 420 is illustrated such that it substantially abuts distal end 414 of sleeve 410, however the distance between distal end 414 may also vary.

Still referring to FIG. 4C, the diameters of copper insert 420, tin insert 430, and tungsten insert 440 can vary, and can be the same diameter as another insert or different (including examples where all inserts are the same or different), provided the edges of each insert extend at least to wall 412 of sleeve 410. The thickness of each insert, measured along an axial direction of sleeve 410, can be substantially uniform. Alternatively, tungsten insert 440 can have a thickness that is thinner at an edge (thickness 445) than at a midpoint (thickness 447). In these examples, the two different thicknesses of tungsten insert 440 produce a ledge 446; ledge 446 rests on radiation safe 450 and the thicker center protrudes into radiation safe 450.

In one example, copper insert 420 has a diameter 422 of about 15 millimeters to about 25 millimeters, and a thickness 424 of about 0.9 millimeters to about 1.1 millimeters; tin insert 430 has a diameter 432 of about 15 millimeters to about 25 millimeters, and a thickness 434 of about 1.0 millimeters to about 1.7 millimeters; and tungsten insert 440 has a diameter 442 of about 15 millimeters to about 25 millimeters, and a thickness 447 of about 0.9 millimeters to about 1.1 millimeters, wherein the thickness of each insert is measured along an axial direction of sleeve 410. In at least one example, copper insert 420 has a thickness 424 of about 0.95 millimeters to about 1.05 millimeters; tin insert 430 has a thickness 434 of about 1.5 to about 1.6 millimeters; and tungsten insert 440 has a thickness 447 of about 0.95 to about 1.05 millimeters, and optionally a thickness 445 of about 0.5 millimeters to about 1.0 millimeters. In at least one example, copper insert 420 has a thickness 424 of about 1.0 millimeter; tin insert 430 has a thickness 434 of about 1.55 millimeters; and the tungsten insert 440 has a thickness 447 of about 1.0 millimeter, and optionally a thickness 445 of about 0.5 millimeters. In at least one example, copper insert 420 has a thickness 424 of about 1.1 millimeters; tin insert 430 has a thickness 434 of about 1.6 millimeters; and tungsten insert 440 has a thickness 447 of about 1.15 millimeters, and optionally a thickness 445 of about 0.7 millimeters. In at least one example, copper insert 420 has a thickness 424 of about 1.02 millimeters; tin insert 430 has a thickness 434 of about 1.57 millimeters; and tungsten insert 440 has a thickness 447 of about 1.02 millimeters, and optionally a thickness 445 of about 0.52 millimeter.

In another example, copper insert 420 has a diameter 422 of about 20 millimeters, and a thickness 424 of about 0.9 millimeters to about 1.1 millimeters; tin insert 430 has a diameter 432 of about 15 millimeters to about 25 millimeters, and a thickness 434 of about 1.0 millimeters to about 1.7 millimeters; and tungsten insert 440 has a diameter 442 of about 15 millimeters to about 25 millimeters, and a thickness 447 of about 0.9 millimeters to about 1.1 millimeters, wherein the thickness of each insert is measured along an axial direction of sleeve 410. In at least one example, copper insert 420 has a thickness 424 of about 1.0 millimeter; tin insert 430 has a thickness 434 of about 1.55 millimeters; and the tungsten insert 440 has a thickness 447 of about 1.0 millimeter, and optionally a thickness 445 of about 0.5 millimeters. In at least one example, copper insert 420 has a thickness 424 of about 1.1 millimeters; tin insert 430 has a thickness 434 of about 1.6 millimeters; and tungsten insert 440 has a thickness 447 of about 1.15 millimeters, and optionally a thickness 445 of about 0.7 millimeters. In at least one example, copper insert 420 has a thickness 424 of about 1.02 millimeters; tin insert 430 has a thickness 434 of about 1.57 millimeters; and tungsten insert 440 has a thickness 447 of about 1.02 millimeters, and optionally a thickness 445 of about 0.52 millimeter.

In another example, copper insert 420 has a diameter 422 of about 20.00 millimeters to 20.50 millimeters, and a thickness 424 of about 1.1 millimeters; tin insert 430 has a diameter 432 of about 20.00 millimeters to about 20.50 mm, and a thickness 434 of about 1.6 millimeters; and tungsten insert 440 has a diameter 442 of about 20.00 millimeters to about 20.50 millimeters, and a thickness 445 of about 0.5 millimeters and a thickness 447 of about 1.0 millimeters, wherein the thickness of each insert is measured along an axial direction of sleeve 410.

In another example, copper insert 420 has a diameter 422 of about 20.00 millimeters to 20.50 millimeters, and a thickness 424 of about 1.1 millimeters; tin insert 430 has a diameter 432 of about 20.00 millimeters to about 20.50 mm, and a thickness 434 of about 1.6 millimeters; and tungsten insert 440 has a diameter 442 of about 20.00 millimeters to about 20.50 millimeters, and a thickness 445 of about 0.7 millimeters and a thickness 447 of about 1.15 millimeters, wherein the thickness of each insert is measured along an axial direction of sleeve 410.

In another example, copper insert 420 has a diameter 422 of about 20.50 millimeters and a thickness 424 of about 1.02 millimeters; tin insert 430 has a diameter 432 of about 20.50 mm and a thickness 434 of about 1.57 millimeters; and tungsten insert 440 has a diameter 442 of about 20.50 millimeters and a thickness 445 of about 0.52 millimeters and a thickness 447 of about 1.02 millimeters, wherein the thickness of each insert is measured along an axial direction of sleeve 410.

Though not depicted in FIG. 4, copper insert 420, tin insert 430, and tungsten insert 440 each have at least one through hole formed therethrough, such that each insert has the same number of through holes and the through hole(s) on each insert are operable to be aligned with each other. The total diameter of the through holes is directly proportional to the amount of low energy gamma rays that reach a gamma-ray detector. In at least one example, the total diameter of the through hole(s), for each insert, is about 1.2 millimeters to about 1.6 millimeters. In at least one example, each insert 420, 430, 440 has a single through hole positioned substantially in the center of the insert 420, 430, 440 and the diameter of the through hole is about 1.2 millimeters to about 1.6 millimeters. Although not necessary because sleeve 410 is low in density and the radiation easily goes through the sleeve 410, corresponding through holes may optionally be present in sleeve 410.

Still referring to FIG. 4C, copper insert 420 has a diameter 422 of about 20.50 millimeters and a thickness 424 of about 1.02 millimeters; tin insert 430 has a diameter 432 of about 20.50 mm and a thickness 434 of about 1.57 millimeters; and tungsten insert 440 has a diameter 442 of about 20.50 millimeters and a thickness 445 of about 0.52 millimeters at an edge and a thickness 447 of about 1.02 millimeters at a midpoint, wherein the thickness of each insert is measured along an axial direction of sleeve 410. The diameters of copper insert 420, tin insert 430, and tungsten insert 440 can vary and need not be the same, provided the edges of each insert extend at least to wall 412 of sleeve 410. The two different thicknesses of tungsten insert 440 produces a ledge 446; ledge 446 rests on radiation safe 450 and the thicker center protrudes into radiation safe 450.

Though not depicted in FIG. 4-D, copper insert 420, tin insert 430, and tungsten insert 440 each have at least one through hole formed therethrough, such that each insert has the same number of through holes and the through hole(s) on each insert are operable to be aligned with each other. The total diameter of the through holes is directly proportional to the amount of low energy gamma rays that reach a gamma-ray detector. In one example, the total diameter of the through hole(s), for each insert, is about 1 millimeter to about 2 millimeters. In another example, the total diameter of the through hole(s), for each insert, is about 1.2 millimeters to about 1.6 millimeters. In at least one example, each insert 420, 430, 440 has a single through hole positioned substantially in the center of the insert 420, 430, 440 and the diameter of the through hole is about 1.2 millimeters to about 1.6 millimeters. Although not necessary because sleeve 410 is low in density and the radiation easily goes through the sleeve 410, corresponding through holes may optionally be present in sleeve 410.

Figure 4D:
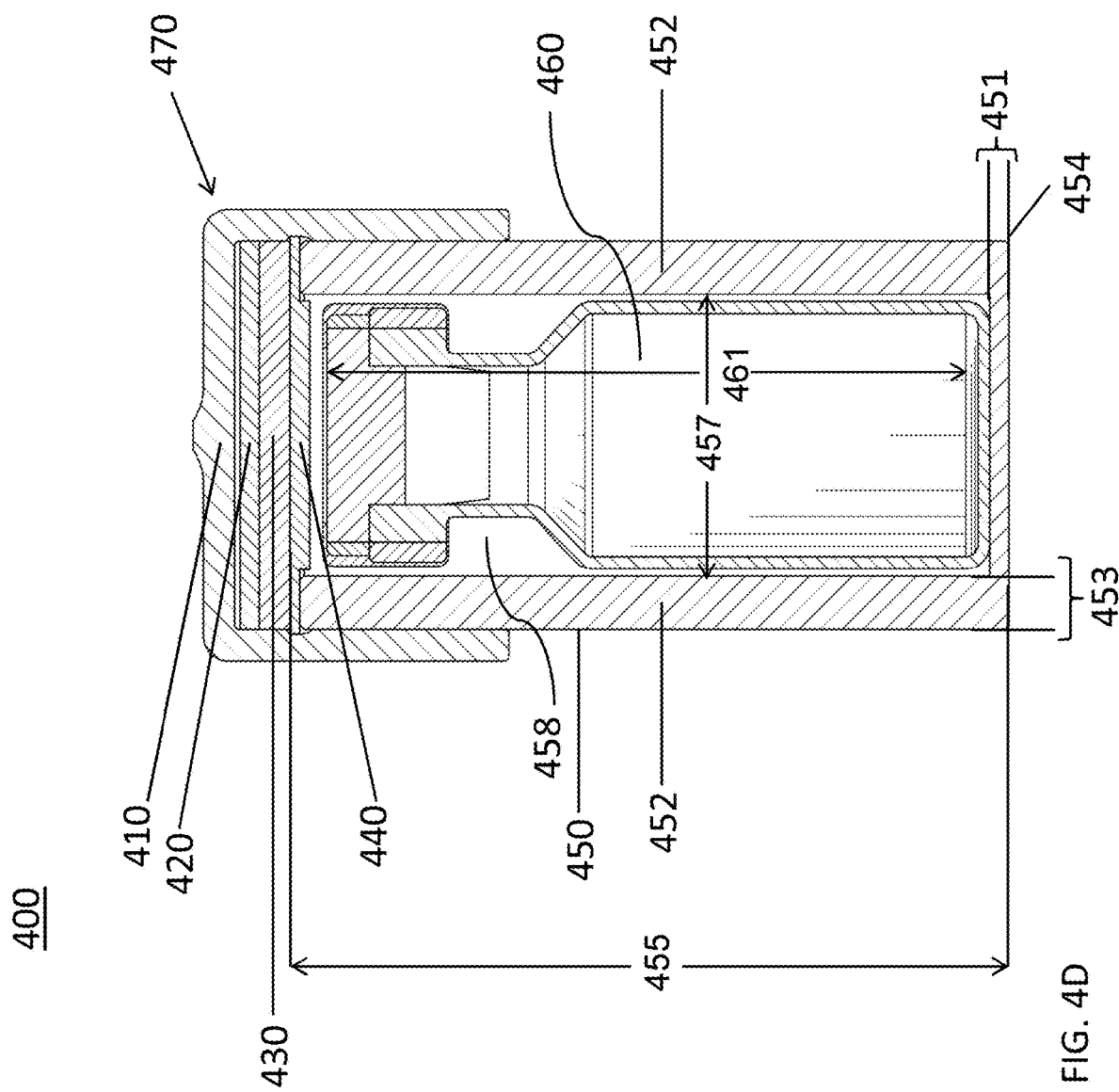

Turning now to FIG. 4D, radiation safe 450 is comprised of tungsten. The tungsten can be a tungsten alloy or pure tungsten (meaning it has a density of 19 g/cm$^3$). In the example of pure tungsten, the radiation safe 450 has a more consistent shielding than an alloy. Radiation safe 450 has a wall 452, a distal end 454, a proximal end 456, and a well 458. Proximal end 456 forms an opening to well 458; well 458 extends along an axial direction of radiation safe 450 to distal end 454; and distal end 454 is closed. In at least one example, closed distal end 454 is integrally formed with wall 452. As depicted, proximal end 416 of sleeve 410 fits over the proximal end 456 of safe 450. In one example, sleeve 410 fits firmly over radiation safe 450 to prevent container 460 from falling out when radiation safe 450 is inverted. Container 460 is a 2 ml vial that has a height 461 of 34.40 millimeters, though alternative containers can also be used (for example, a bottle, a jar, a flask, etc. of various sizes and shapes), provided the alternatively shaped container does not alter the fit of sleeve 410 over proximal end 456 of radiation safe 450.

Wall 452 has a height 455, measured in the axial direction of radiation safe 450, and a thickness 453 that can vary. In one example, wall 452 has a height 455 of about 30 millimeters to about 50 millimeters, and a thickness 452 of about 2 millimeters to about 4 millimeters. In at least one example, thickness 452 is about 2 millimeters to about 3 millimeters. In at least one example, thickness 452 is about 2.5 millimeters to about 3.0 millimeters. In at least one example, thickness 452 is about 2.7 millimeters. In at least one example, thickness 452 is 2.73 millimeters to 2.77 millimeters.

In another example, wall 452 has a height 455 of about 30 millimeters to about 40 millimeters, and a thickness 452 of about 2 millimeters to about 4 millimeters. In at least one example, thickness 452 is about 2 millimeters to about 3 millimeters. In at least one example, thickness 452 is about 2.5 millimeters to about 3.0 millimeters. In at least one example, thickness 452 is about 2.7 millimeters. In at least one example, thickness 452 is 2.73 millimeters to 2.77 millimeters.

In another example, wall 452 has a height 455 of about 35 millimeters, and a thickness 452 of about 2 millimeters to about 4 millimeters. In at least one example, thickness 452 is about 2 millimeters to about 3 millimeters. In at least one example, thickness 452 is about 2.5 millimeters to about 3.0 millimeters. In at least one example, thickness 452 is about 2.7 millimeters. In at least one example, thickness 452 is 2.73 millimeters to 2.77 millimeters.

In another example, wall 452 has a height 455 of about 35 millimeters, and a thickness 452 of about 2 millimeters to about 4 millimeters. In at least one example, thickness 452 is about 2 millimeters to about 3 millimeters. In at least one example, thickness 452 is about 2.5 millimeters to about 3.0 millimeters. In at least one example, thickness 452 is about 2.7 millimeters. In at least one example, thickness 452 is 2.73 millimeters to 2.77 millimeters.

In another example, wall 452 has a height 455 of about 36.6 millimeters, and a thickness 452 of about 2 millimeters to about 4 millimeters. In at least one example, thickness 452 is about 2 millimeters to about 3 millimeters. In at least one example, thickness 452 is about 2.5 millimeters to about 3.0 millimeters. In at least one example, thickness 452 is about 2.7 millimeters. In at least one example, thickness 452 is 2.73 millimeters to 2.77 millimeters.

Well 458 has a diameter 457 that can also vary. In one example, well 348 has a diameter 457 of about 5 millimeters to about 20 millimeters. In at least one example, diameter 457 is about 10 millimeters to about 20 millimeters. In at least one example, diameter 457 is about 15 millimeters. In at least one example, diameter 457 is about 14.5 millimeters. In at least one example, diameter 457 is 14.48 millimeters to 14.52 millimeters.

Distal end 454 has a thickness 451. The thickness 451 at the radiation safe's approximate midpoint is an important aspect of the radiation safe for radionuclidic impurity measurement, as the safe must sufficiently shield the detector from low energies that may saturate the detector yet allow enough high energies to go through to accurately detect and identify impurities at low concentrations.

In one example, distal end 454 has a thickness 451 of about 0.7 millimeters to about 1.3 millimeters. In at least one example, distal end 454 has an average thickness 451 of about 0.9 millimeters and, optionally, a thickness measured at the midpoint of radiation safe 460 of about 1 millimeter. In at least one example, distal end 454 has an average thickness 451 of about 0.9 millimeters and, optionally, a thickness measured at the midpoint of radiation safe 460 of about 1 millimeter. In at least one example, distal end 454 has an average thickness 451 of about 0.93 millimeters and, optionally, a thickness measured at the midpoint of radiation safe 460 of 1.00 millimeter to 1.02 millimeters.

In another example, distal end 454 has a thickness 451 of about 0.9 millimeters to about 1.1 millimeters. In at least one example, distal end 454 has an average thickness 451 of about 0.9 millimeters and, optionally, a thickness measured at the midpoint of radiation safe 460 of about 1 millimeter. In at least one example, distal end 454 has an average thickness 451 of about 0.9 millimeters and, optionally, a thickness measured at the midpoint of radiation safe 460 of about 1 millimeter. In at least one example, distal end 454 has an average thickness 451 of about 0.93 millimeters and, optionally, a thickness measured at the midpoint of radiation safe 460 of 1.00 millimeter to 1.02 millimeters.

In another example, the present disclosure provides an equivalent of a gamma-ray shield of FIG. 4. An equivalent of a gamma-ray shield of FIG. 4, as used herein, refers to a gamma-ray shield that has been modified in a manner that does not substantially alter the operability of the gamma-ray shield for use in Xe-133 identification and radionuclidic impurity measurements, in particular the ability to detect radionuclidic impurities that may be present at 0.01%. Certain dimensions of gamma-ray shield 400 may vary without substantially altering its operability. For example, to accommodate narrower or wider containers, diameter 457 of well 458 can be decreased or increased, respectively. Accordingly, diameter 418 of sleeve 410 will also need to be similarly adjusted, and diameter 422 of copper insert 420, diameter 432 of tin insert 430, and diameter 442 of tungsten insert 420 may also need adjustment. Similarly, height 455 of wall 452 of safe 450 may be adjusted (smaller or larger) to accommodate shorter or taller containers. Height 411 of wall 412 of sleeve 410 can be independently adjusted (smaller or larger) to provide a suitable fit over the safe as needed for different materials and/or to minimize cost.

Figure 5:
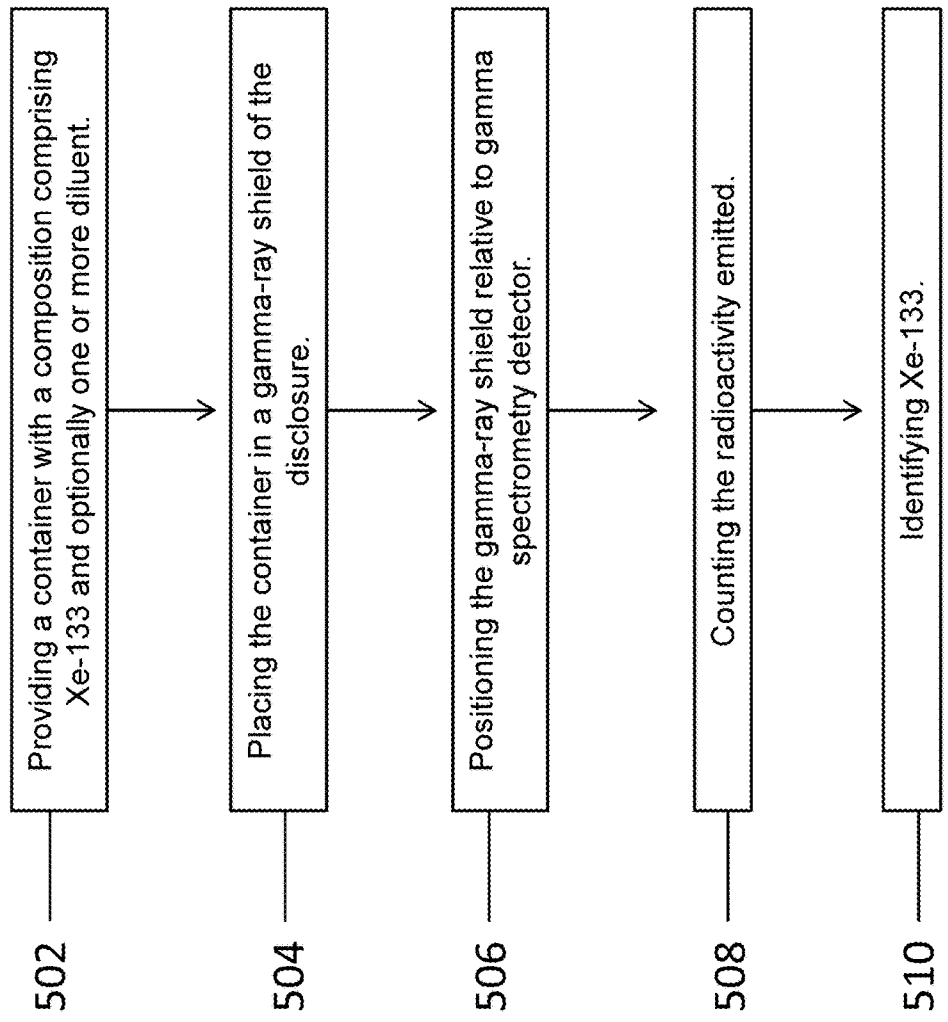
FIG. 5 is a flowchart illustrating a method of using a gamma-ray shield according to the present disclosure.

FIG. 5 illustrates a flowchart for radionuclide identification. Referring to FIG. 5, a flowchart is presented in accordance with an example. The example method 500 is provided by way of example, as there are a variety of ways to carry out the method. The method 500 described below can be carried out using the configurations illustrated in FIGS. 1-4, for example, and various elements of these figures are referenced in explaining example method 500. Each block shown in FIG. 5 represents one or more processes, methods or subroutines, carried out in the example method 500. Furthermore, the illustrated order of blocks is illustrative only and the order of the blocks can change according to the present disclosure. Additional blocks may be added or fewer blocks may be utilized, without departing from this disclosure. The example method 500 can begin at block 502.

At block 502, the method includes providing a container comprising a composition comprising Xe-133 and optionally one or more diluents, and in at least one example wherein the composition has a known amount of radioactivity. In some examples, a composition comprises at least about 2 µCi of total radioactivity. In other examples, a composition comprises at least about 200 µCi of total radioactivity. In other examples, a composition comprises at least about 400 µCi of total radioactivity. In other examples, a composition comprises at least about 800 µCi of total radioactivity. In other examples, a composition comprises at least about 1,000 µCi of total radioactivity. In other examples, a composition comprises at least about 2,000 µCi of total radioactivity. In other examples, a composition comprises at least about 4,000 µCi of total radioactivity. In other examples, a composition comprises at least about 10,000 µCi of total radioactivity. In other examples, a composition comprises at least about 20,000 µCi of total radioactivity. In other examples, a composition comprises at least about 40,000 µCi of total radioactivity. In other examples, a composition comprises at least about 60,000 µCi of total radioactivity. In other examples, a composition comprises at least about 80,000 µCi of total radioactivity. In other examples, a composition comprises at least about 100,000 µCi of total radioactivity. In other examples, a composition comprises about 4,000 µCi to about 100,000 µCi of total radioactivity. In other examples, a composition comprises about 4,000 µCi to about 80,000 µCi of total radioactivity. In other examples, a composition comprises about 4,000 µCi to about 60,000 µCi of total radioactivity. In other examples, a composition comprises about 4,000 µCi to about 40,000 µCi of total radioactivity. In other examples, a composition comprises about 20,000 µCi to about 60,000 µCi of total radioactivity. In other examples, a composition comprises about 40,000 µCi to about 80,000 µCi of total radioactivity. In other examples, a composition comprises about 60,000 to about 100,000 µCi of total radioactivity. In other examples, a composition comprises about 4,000 µCi to about 20,000 µCi of total radioactivity. In other examples, a composition comprises about 4,000 µCi to about 10,000 µCi of total radioactivity. In other examples, a composition comprises about 10,000 µCi to about 20,000 µCi of total radioactivity. In each of the above examples, the radionuclidic impurity in the composition can be about 5% or less, about 1% or less, about 0.5% or less, or about 0.1% or less. In an at least one of the above examples, a composition comprises (a) a minimum 99.9% as radioxenons (Xe-133, Xe-133m, and Xe-131m) with less than or equal to 0.6% Xe-133m and less than or equal to 1.0% Xe-131m, and (b) all detected radioactive impurities (Kr-85, I-131, and any others) cannot exceed 0.1% with limits of less than or equal to 0.03% Kr-85, less than or equal to 0.01% I-131 and less than or equal to 0.06% for all other impurities. In another example, a composition comprises (a) a minimum 99.9% as radioxenons (Xe-133, Xe-133m, and Xe-131m) with Xe-133m less than or equal to 0.3% and Xe-131m less than or equal to 1.5%, and (b) all detected radioactive impurities (Kr-85, I-131, and any others) cannot exceed 0.1%, with limitations of Kr-85 less than or equal to 0.06%, I-131 less than or equal to 0.01%, and all other impurities less than or equal to 0.03%.

At block 504, the method includes placing the container in a gamma-ray shield of the present disclosure. In at least one example, the gamma-ray shield is a gamma-ray shield of FIG. 4. In at least one example, the gamma-ray shield is an equivalent of a gamma-ray shield of FIG. 4.

At block 506, the method includes positioning the gamma-ray shield relative to a gamma-ray spectrometry detector. Non-limiting examples of suitable gamma-ray spectrometry detectors include scintillation detectors and HPGe detectors. In at least one example, the gamma-ray shield is positioned such that the distal end of the gamma-ray attenuator of the gamma-ray shield is a suitable distance from a gamma spectrometry detector's surface. The distance between the distal end of the gamma-ray attenuator and the gamma spectrometry detector's surface may vary depending upon the amount or radiation reaching the detector's surface. As a non-limiting example, the distance may be about 10 cm when a composition comprises about 4,000 µCi to about 20,000 µCi of total radioactivity; about 20 cm when a composition comprises about 10,000 µCi to about 80,000 µCi of total radioactivity, or about 20,000 µCi to about 80,000 µCi of total radioactivity; or about 25 cm when a composition comprises about 40,000 µCi to about 80,000 µCi of total radioactivity, or about 60,000 µCi to about 100,000 µCi of total radioactivity.

At block 508, the method includes counting the radioactivity emitted from the sample. The method can include counting the radioactivity emitted from the sample for a sufficient amount of time or until a sufficient number of counts are obtained. In one example, counting occurs until spectrum gamma peaks at 31 keV and 81 keV are significantly above background. "Significantly above background" may be 3 standard deviations above background. In one example, the sufficient amount of time can be a predetermined amount of time. The predetermined amount of time can be according to a standard. In one example, the sufficient amount of counts can be a predetermined number of counts. The predetermined number of counts can be according to a standard.

At block 510, the method includes identifying Xe-133. In at least one example, the identification of Xe-133 is performed by analyzing major photo peaks at about 31.0 keV and about 81.0 keV. In at least one example, these peaks should be found within about 1.0 keV of these energies.

Figure 6:
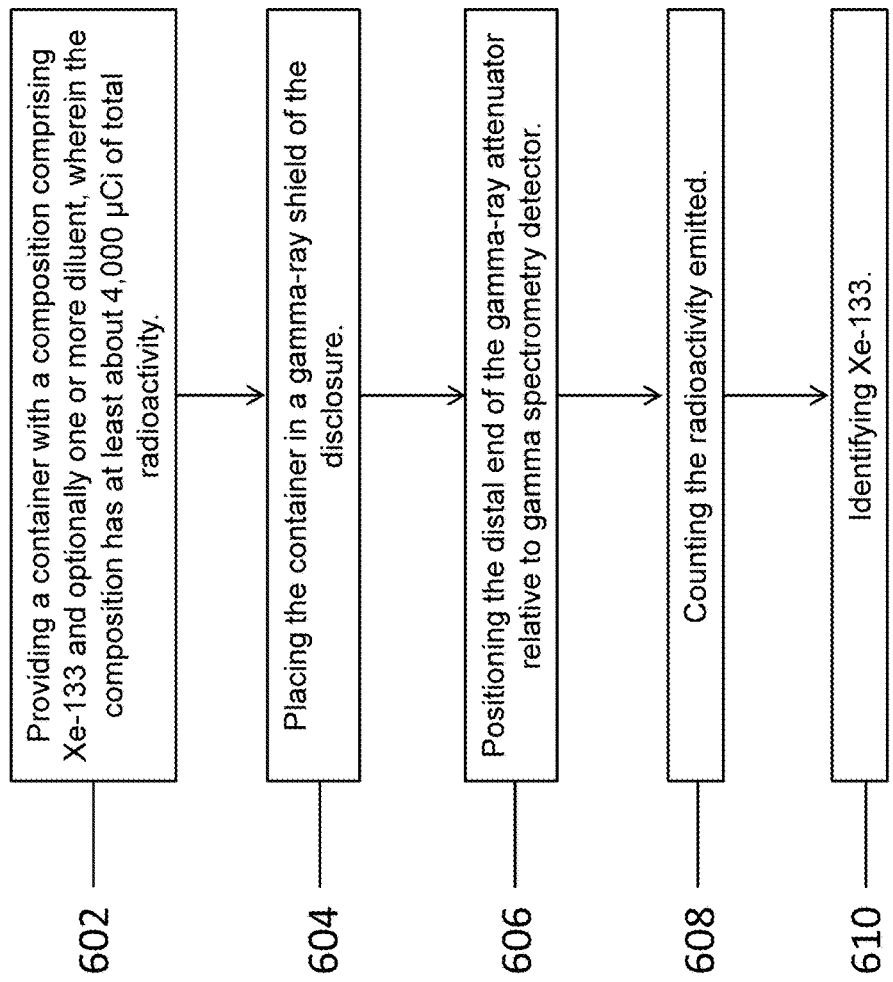
FIG. 6 is a flowchart illustrating a method of using a gamma-ray shield according to the present disclosure.

FIG. 6 illustrates a flowchart for radionuclide identification. Referring to FIG. 6, a flowchart is presented in accordance with an example. The example method 600 is provided by way of example, as there are a variety of ways to carry out the method. The method 600 described below can be carried out using the configurations illustrated in FIGS. 1-4, for example, and various elements of these figures are referenced in explaining example method 600. Each block shown in FIG. 6 represents one or more processes, methods or subroutines, carried out in the example method 600. Furthermore, the illustrated order of blocks is illustrative only and the order of the blocks can change according to the present disclosure. Additional blocks may be added or fewer blocks may be utilized, without departing from this disclosure. The example method 600 can begin at block 602.

At block 602, the method includes providing a container comprising a composition comprising Xe-133 and optionally one or more diluent, wherein the composition has at least about 4,000 µCi of total radioactivity. In some examples, the composition can comprise about 4,000 µCi to about 10,000 µCi of total radioactivity. In other examples, the composition can comprise about 4,000 µCi to about 10,000 µCi of total radioactivity, or about 10,000 to about 20,000 µCi of total radioactivity. In other examples, the composition can comprise about 4,000 µCi, about 5,000 µCi, about 6,000 µCi, about 7,000 µCi, or about 8,000 µCi of total radioactivity. In other examples, the composition can comprise about 9,000 µCi, about 10,000 µCi, about 11,000 µCi, about 12,000 µCi, or about 13,000 µCi of total radioactivity. In other examples, the composition can comprise about 14,000 µCi, about 15,000 µCi, about 16,000 µCi, about 17,000 µCi, or about 18,000 µCi of total radioactivity. In other examples, the composition can comprise about 19,000 µCi, about 20,000 µCi, or more than about 20,000 µCi of total radioactivity. In each of the above examples, the radionuclidic impurity in the composition can be about 5% or less, about 1% or less, about 0.5% or less, or about 0.1% or less. In at least one of the above examples, a composition comprises (a) a minimum 99.9% as radioxenons (Xe-133, Xe-133m, and Xe-131m) with less than or equal to 0.6% Xe-133m and less than or equal to 1.0% Xe-131m, and (b) all detected radioactive impurities (Kr-85, I-131, and any others) cannot exceed 0.1% with limits of less than or equal to 0.03% Kr-85, less than or equal to 0.01% I-131 and less than or equal to 0.06% for all other impurities. In another example, a composition comprises (a) a minimum 99.9% as radioxenons (Xe-133, Xe-133m, and Xe-131m) with Xe-133m less than or equal to 0.3% and Xe-131m less than or equal to 1.5%, and (b) all detected radioactive impurities (Kr-85, I-131, and any others) cannot exceed 0.1%, with limitations of Kr-85 less than or equal to 0.06%, I-131 less than or equal to 0.01%, and all other impurities less than or equal to 0.03%.

At block 604, the method includes placing the container in a gamma-ray shield of the present disclosure. In at least one example, the gamma-ray shield is a gamma-ray shield of FIG. 4. In at least one example, the gamma-ray shield is an equivalent of a gamma-ray shield of FIG. 4.

At block 606, the method includes positioning the distal end of the gamma-ray attenuator of the gamma-ray shield relative to a gamma-ray spectrometry detector. Non-limiting examples of suitable gamma-ray spectrometry detectors include scintillation detectors and HPGe detectors. The distance between the distal end of the radiation safe and the gamma spectrometry detector's surface may vary depending upon the amount or radiation reaching the detector's surface. In one example, a suitable distance between an HPGe detector's surface and the distal end of a gamma-ray attenuator of FIG. 4 is about 10 cm. The distance may be decreased as needed if a composition comprises less than about 4,000

µCi of total radioactivity, and increased if a composition comprises more than about 20,000 µCi of total radioactivity. The distance may be similarly adjusted if a gamma-ray shield provides less attenuation than the gamma ray shield of FIG. 4.

At block 608, the method includes counting the radioactivity emitted from the sample. The method can include counting the radioactivity emitted from the sample for a sufficient amount of time or until a sufficient number of counts are obtained. In one example, counting occurs until spectrum gamma peaks at 31 keV and 81 keV are significantly above background. "Significantly above background" may be 3 standard deviations above background. In one example, the sufficient amount of time can be a predetermined amount of time. The predetermined amount of time can be according to a standard. The predetermined amount of time for a composition comprising about 4,000 µCi to about 20,000 µCi of total radioactivity can be for at least about 5 minutes, at least about 10 minutes, or at least about 15 minutes, or more. In one example, the sufficient amount of counts can be a predetermined number of counts. The predetermined number of counts can be according to a standard. The predetermined number of counts for a composition comprising about 4,000 µCi to about 20,000 µCi of total radioactivity can be about 500, about 1,000 or more.

At block 610, the method includes identifying Xe-133. In at least one example, the identification of Xe-133 is performed by analyzing major photo peaks at about 31.0 keV and about 81.0 keV. In at least one example, these peaks should be found within about 1.0 keV of these energies.

Figure 7:
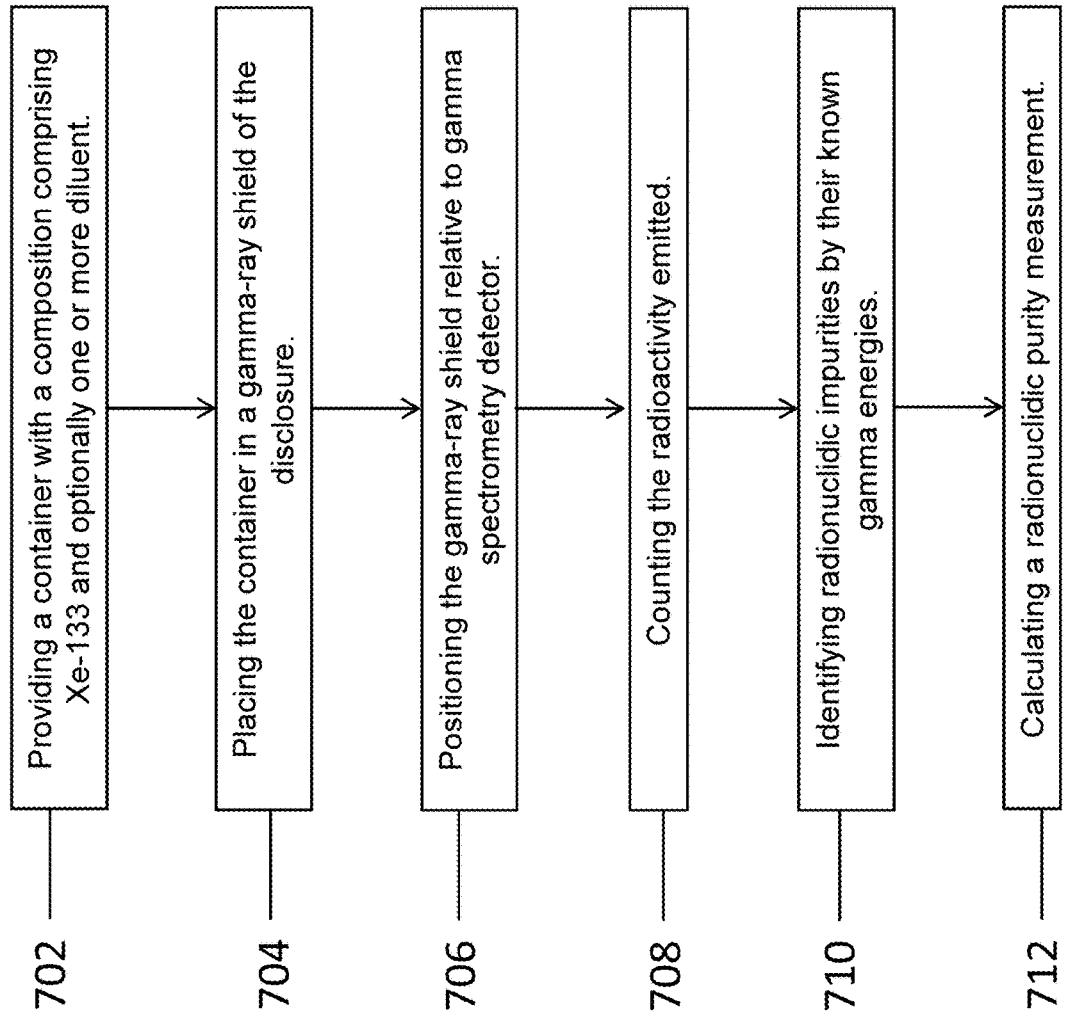
FIG. 7 is a flowchart illustrating a method of using a gamma-ray shield according to the present disclosure.

FIG. 7 illustrates a flowchart for radionuclidic purity measurement. Referring to FIG. 7, a flowchart is presented in accordance with an example. The example method 700 is provided by way of example, as there are a variety of ways to carry out the method. The method 700 described below can be carried out using the configurations illustrated in FIGS. 1-4, for example, and various elements of these figures are referenced in explaining example method 700. Each block shown in FIG. 7 represents one or more processes, methods or subroutines, carried out in the example method 700. Furthermore, the illustrated order of blocks is illustrative only and the order of the blocks can change according to the present disclosure. Additional blocks may be added or fewer blocks may be utilized, without departing from this disclosure. The example method 700 can begin at block 702.

At block 702, the method includes providing a container comprising a composition with a known amount of radioactivity and in at least one example the composition comprises Xe-133 and optionally one or more diluent. In some examples, a composition comprises at least about 2 µCi of total radioactivity. In other examples, a composition comprises at least about 200 µCi of total radioactivity. In other examples, a composition comprises at least about 400 µCi of total radioactivity. In other examples, a composition comprises at least about 800 µCi of total radioactivity. In other examples, a composition comprises at least about 1,000 µCi of total radioactivity. In other examples, a composition comprises at least about 2,000 µCi of total radioactivity. In other examples, a composition comprises at least about 4,000 µCi of total radioactivity. In other examples, a composition comprises at least about 10,000 µCi of total radioactivity. In other examples, a composition comprises at least about 20,000 µCi of total radioactivity. In other examples, a composition comprises at least about 40,000 µCi of total radioactivity. In other examples, a composition comprises at least about 60,000 µCi of total radioactivity. In other examples, a composition comprises at least about 80,000 µCi of total radioactivity. In other examples, a composition comprises at least about 100,000 µCi of total radioactivity. In other examples, a composition comprises about 4,000 µCi to about 100,000 µCi of total radioactivity. In other examples, a composition comprises about 4,000 µCi to about 80,000 µCi of total radioactivity. In other examples, a composition comprises about 4,000 µCi to about 60,000 µCi of total radioactivity. In other examples, a composition comprises about 4,000 µCi to about 40,000 µCi of total radioactivity. In other examples, a composition comprises about 20,000 µCi to about 60,000 µCi of total radioactivity. In other examples, a composition comprises about 40,000 µCi to about 80,000 µCi of total radioactivity. In other examples, a composition comprises about 60,000 to about 100,000 µCi of total radioactivity. In other examples, a composition comprises about 4,000 µCi to about 20,000 µCi of total radioactivity. In other examples, a composition comprises about 4,000 µCi to about 10,000 µCi of total radioactivity. In other examples, a composition comprises about 10,000 µCi to about 20,000 µCi of total radioactivity. In each of the above examples, the radionuclidic impurity in the composition can be about 5% or less, about 1% or less, about 0.5% or less, or about 0.1% or less. In an at least one of the above examples, a composition comprises (a) a minimum 99.9% as radioxenons (Xe-133, Xe-133m, and Xe-131m) with less than or equal to 0.6% Xe-133m and less than or equal to 1.0% Xe-131m, and (b) all detected radioactive impurities (Kr-85, I-131, and any others) cannot exceed 0.1% with limits of less than or equal to 0.03% Kr-85, less than or equal to 0.01% I-131 and less than or equal to 0.06% for all other impurities. In another example, a composition comprises (a) a minimum 99.9% as radioxenons (Xe-133, Xe-133m, and Xe-131m) with Xe-133m less than or equal to 0.3% and Xe-131m less than or equal to 1.5%, and (b) all detected radioactive impurities (Kr-85, I-131, and any others) cannot exceed 0.1%, with limitations of Kr-85 less than or equal to 0.06%, I-131 less than or equal to 0.01%, and all other impurities less than or equal to 0.03%.

At block 704, the method includes placing the container in a gamma-ray shield of the present disclosure. In at least one example, the gamma-ray shield is a gamma-ray shield of FIG. 4. In at least one example, the gamma-ray shield is an equivalent of a gamma-ray shield of FIG. 4.

At block 706, the method includes positioning the gamma-ray shield relative to a gamma-ray spectrometry detector. Non-limiting examples of suitable gamma-ray spectrometry detectors include scintillation detectors and HPGe detectors. In one embodiment, the gamma-ray shield is positioned such that the distal end of the radiation safe of the gamma-ray shield is a suitable distance from a gamma spectrometry detector's surface. The distance between the distal end of the radiation safe and the gamma spectrometry detector's surface may vary depending upon the amount or radiation reaching the detector's surface. As a non-limiting example, the distance may be about 10 cm when a composition comprises about 4,000 µCi to about 20,000 µCi of total radioactivity; about 20 cm when a composition comprises about 10,000 µCi to about 80,000 µCi of total radioactivity, or about 20,000 µCi to about 80,000 µCi of total radioactivity; or about 25 cm when a composition comprises about 40,000 µCi to about 80,000 µCi of total radioactivity, or about 60,000 µCi to about 100,000 µCi of total radioactivity.

At block 708, the method includes counting the radioactivity emitted from the sample for a sufficient amount of time. The method can include counting the radioactivity emitted from the sample for a sufficient amount of time or until a sufficient number of counts are obtained. In one example, counting occurs until spectrum gamma peaks are significantly above background. "Significantly above background" may be 3 standard deviations above background. In one example, the sufficient amount of time can be a predetermined amount of time. The predetermined amount of time can be according to a standard. In one example, the sufficient amount of counts can be a predetermined number of counts. The predetermined number of counts can be according to a standard.

At block 710, the method includes identifying radionuclidic impurities by their known gamma energies.

At block 712, the method includes calculating a radionuclidic purity measurement. In at least example, radionuclidic purity is calculated as the ratio, expressed as a percentage, of the radioactivity of the desired radionuclide to the total radioactivity of the composition. In at least one example, radionuclidic impurity is calculated as the ratio, expressed as a percentage, of the total radioactivity for all radionuclidic impurities to the total radioactivity of the composition. In at least one example, radionuclidic impurity is calculated as the ratio, expressed as a percentage, of the total radioactivity for a specific radionuclidic impurity, or a subset of radionuclidic impurities, to the total radioactivity of the composition. In one example, the specific radionuclidic impurity can be Xe-133m, Xe-131m, Kr-85, or I-131. In another example, the specific radionuclidic impurity can be Kr-85, Xe-131m, Xe-133m, I-131, Cs-137, Ba-140, or Zr-95. In one example, the subset of radionuclidic impurities can include all detected radioxenon impurities. In another example, the subset of radionuclidic impurities can include all detected radioactive impurities excluding radioxenon impurities. In another example, the subset of radionuclidic impurities can include all detected radioactive impurities excluding Xe-133m, Xe-131m, Kr-85, and I-131.

Figure 8:
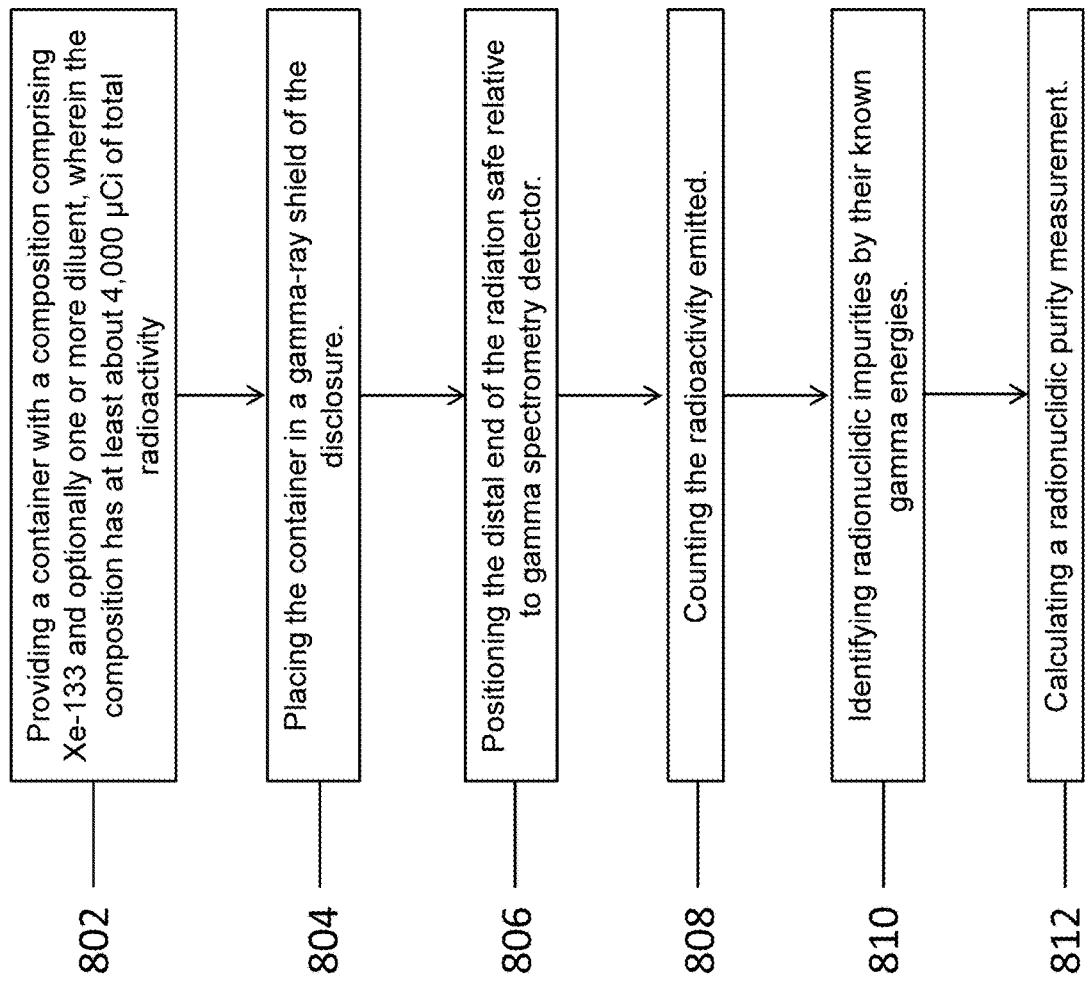
FIG. 8 is a flowchart illustrating a method of using a gamma-ray shield according to the present disclosure.

FIG. 8 illustrates a flowchart for radionuclidic purity measurement. Referring to FIG. 8, a flowchart is presented in accordance with an example. The example method 800 is provided by way of example, as there are a variety of ways to carry out the method. The method 800 described below can be carried out using the configurations illustrated in FIGS. 1-4, for example, and various elements of these figures are referenced in explaining example method 800. Each block shown in FIG. 8 represents one or more processes, methods or subroutines, carried out in the example method 800. Furthermore, the illustrated order of blocks is illustrative only and the order of the blocks can change according to the present disclosure. Additional blocks may be added or fewer blocks may be utilized, without departing from this disclosure. The example method 800 can begin at block 802.

At block 802, the method includes providing a container comprising a composition with about 4,000 µCi to about 20,000 µCi of total radioactivity and in at least one example the composition comprises Xe-133 and optionally one or more diluent. In some examples, a composition comprises about 4,000 to about 10,000 µCi of total radioactivity. In other examples, a composition comprises about 10,000 to about 20,000 µCi of total radioactivity. In each of the above examples, the radionuclidic impurity in the composition can be about 5% or less, about 1% or less, about 0.5% or less, or about 0.1% or less. In an at least one of the above examples, a composition comprises (a) a minimum 99.9% as radioxenons (Xe-133, Xe-133m, and Xe-131m) with less than or equal to 0.6% Xe-133m and less than or equal to 1.0% Xe-131m, and (b) all detected radioactive impurities (Kr-85, I-131, and any others) cannot exceed 0.1% with limits of less than or equal to 0.03% Kr-85, less than or equal to 0.01% I-131 and less than or equal to 0.06% for all other impurities. In another example, a composition comprises (a) a minimum 99.9% as radioxenons (Xe-133, Xe-133m, and Xe-131m) with Xe-133m less than or equal to 0.3% and Xe-131m less than or equal to 1.5%, and (b) all detected radioactive impurities (Kr-85, I-131, and any others) cannot exceed 0.1%, with limitations of Kr-85 less than or equal to 0.06%, I-131 less than or equal to 0.01%, and all other impurities less than or equal to 0.03%.

At block 804, the method includes placing the container in a gamma-ray shield of the present disclosure. In at least one example, the gamma-ray shield is a gamma-ray shield of FIG. 4. In at least one example, the gamma-ray shield is an equivalent of a gamma-ray shield of FIG. 4.

At block 806, the method includes positioning the distal end of the radiation safe of the gamma-ray shield relative to a gamma-ray spectrometry detector. Non-limiting examples of suitable gamma-ray spectrometry detectors include scintillation detectors and HPGe detectors. The distance between the distal end of the radiation safe and the gamma spectrometry detector's surface may vary depending upon the amount or radiation reaching the detector's surface. In one example, a suitable distance between an HPGe detector's surface and the distal end of a radiation shield of FIG. 4 is about 10 cm. The distance may be decreased as needed if a composition comprises less than about 4,000 µCi of total radioactivity, and increased if a composition comprises more than about 20,000 µCi of total radioactivity. The distance may be similarly adjusted if a gamma-ray shield provides less or more attenuation than the gamma ray shield of FIG. 4.

At block 808, the method includes counting the radioactivity emitted from the sample for a sufficient amount of time. The method can include counting the radioactivity emitted from the sample for a sufficient amount of time or until a sufficient number of counts are obtained. In one example, counting occurs until spectrum gamma peaks are significantly above background. "Significantly above background" may be 3 standard deviations above background. In one example, the sufficient amount of time can be a predetermined amount of time. The predetermined amount of time can be according to a standard. The predetermined amount of time for a composition comprising about 4,000 µCi to about 20,000 µCi of total radioactivity can be for at least about 20 minutes, at least about 30 minutes, at least about 45 minutes, at least about 60 minutes, or more. In one example, the sufficient amount of counts can be a predetermined number of counts. The predetermined number of counts can be according to a standard.

At block 810, the method includes identifying radionuclidic impurities by their known gamma energies.

At block 812, the method includes calculating a radionuclidic purity measurement. In at least example, radionuclidic purity is calculated as the ratio, expressed as a percentage, of the radioactivity of the desired radionuclide to the total radioactivity of the composition. In at least one example, radionuclidic impurity is calculated as the ratio, expressed as a percentage, of the total radioactivity for all radionuclidic impurities to the total radioactivity of the composition. In at least one example, radionuclidic impurity is calculated as the ratio, expressed as a percentage, of the total radioactivity for a specific radionuclidic impurity, or a subset of radionuclidic impurities, to the total radioactivity of the composition. In one example, the specific radionuclidic impurity can be Xe-133m, Xe-131m, Kr-85, or I-131. In another example, the specific radionuclidic impurity can be Kr-85, Xe-131m, Xe-133m, I-131, Cs-137, Ba-140, or Zr-95. In one example, the subset of radionuclidic impurities can include all detected radioxenon impurities. In another example, the subset of radionuclidic impurities can include all detected radioactive impurities excluding radioxenon impurities. In another example, the subset of radionuclidic impurities can include all detected radioactive impurities excluding Xe-133m, Xe-131m, Kr-85, and I-131.

Figure 9:
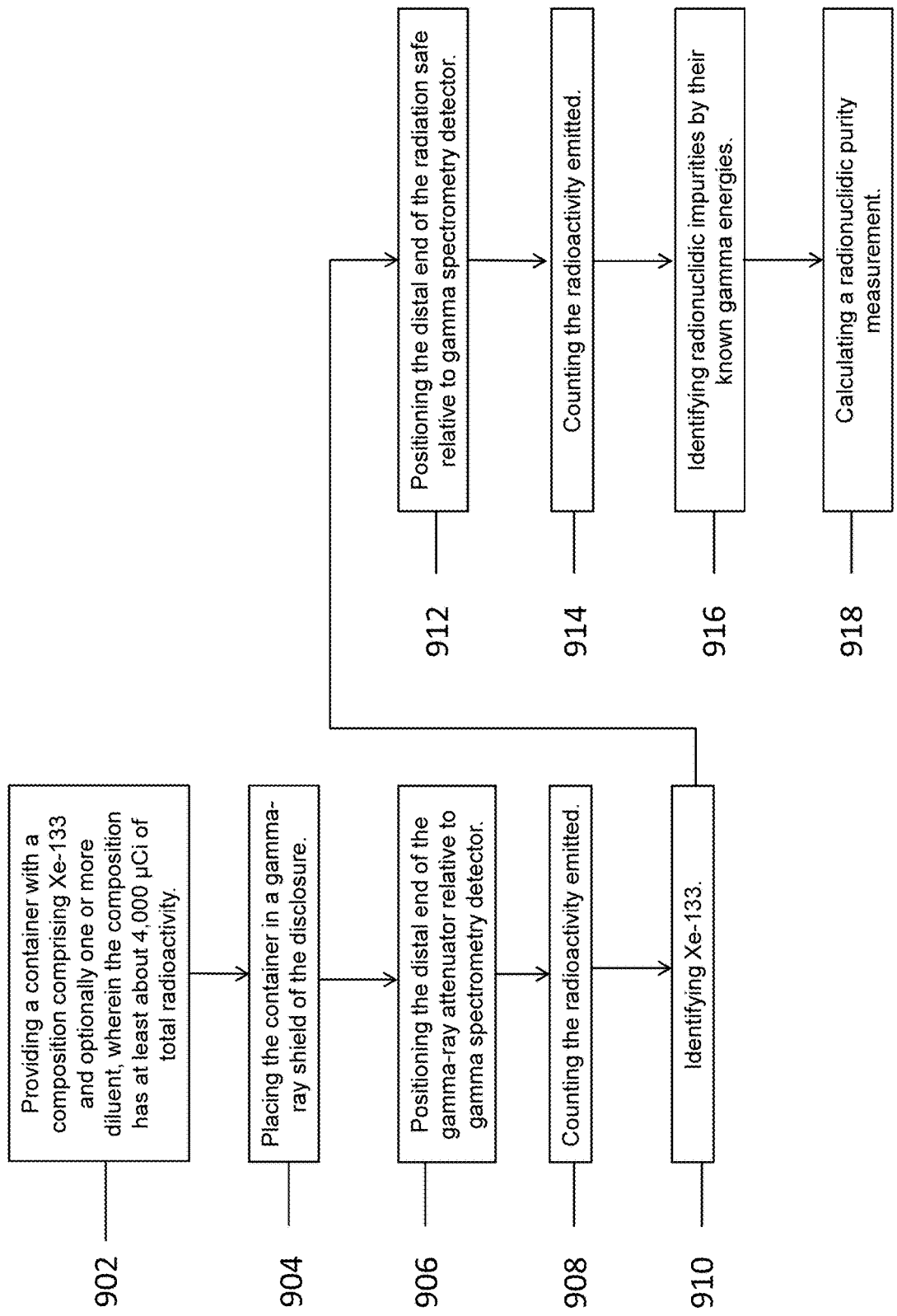
FIG. 9 is a flowchart illustrating a method of using a gamma-ray shield according to the present disclosure.

FIG. 9 illustrates a flowchart for radionuclide identification and radionuclidic purity measurement using a single sample. Referring to FIG. 9, a flowchart is presented in accordance with an example. The example method 900 is provided by way of example, as there are a variety of ways to carry out the method. The method 900 described below can be carried out using the configurations illustrated in FIGS. 1-4, for example, and various elements of these figures are referenced in explaining example method 900. Each block shown in FIG. 9 represents one or more processes, methods or subroutines, carried out in the example method 900. Furthermore, the illustrated order of blocks is illustrative only and the order of the blocks can change according to the present disclosure. In particular, although method 900 illustrates performing radionuclide identification before radionuclidic purity measurement, radionuclidic purity measurement may occur first. Additional blocks may be added or fewer blocks may be utilized, without departing from this disclosure. The example method 900 can begin at block 902.

At block 902, the method includes providing a container comprising a composition comprising Xe-133 and optionally one or more diluent, wherein the composition has at least about 4,000 µCi of total radioactivity. In some examples, the composition can comprise about 4,000 µCi to about 10,000 µCi of total radioactivity. In other examples, the composition can comprise about 4,000 µCi to about 10,000 µCi of total radioactivity, or about 10,000 to about 20,000 µCi of total radioactivity. In other examples, the composition can comprise about 4,000 µCi, about 5,000 µCi, about 6,000 µCi, about 7,000 µCi, or about 8,000 µCi of total radioactivity. In other examples, the composition can comprise about 9,000 µCi, about 10,000 µCi, about 11,000 µCi, about 12,000 µCi, or about 13,000 µCi of total radioactivity. In other examples, the composition can comprise about 14,000 µCi, about 15,000 µCi, about 16,000 µCi, about 17,000 µCi, or about 18,000 µCi of total radioactivity. In other examples, the composition can comprise about 19,000 µCi, about 20,000 µCi, or more than about 20,000 µCi of total radioactivity. In each of the above examples, the radionuclidic impurity in the composition can be about 5% or less, about 1% or less, about 0.5% or less, or about 0.1% or less. In at least one of the above examples, a composition comprises (a) a minimum 99.9% as radioxenons (Xe-133, Xe-133m, and Xe-131m) with less than or equal to 0.6% Xe-133m and less than or equal to 1.0% Xe-131m, and (b) all detected radioactive impurities (Kr-85, I-131, and any others) cannot exceed 0.1% with limits of less than or equal to 0.03% Kr-85, less than or equal to 0.01% I-131 and less than or equal to 0.06% for all other impurities. In another example, a composition comprises (a) a minimum 99.9% as radioxenons (Xe-133, Xe-133m, and Xe-131m) with Xe-133m less than or equal to 0.3% and Xe-131m less than or equal to 1.5%, and (b) all detected radioactive impurities (Kr-85, I-131, and any others) cannot exceed 0.1%, with limitations of Kr-85 less than or equal to 0.06%, I-131 less than or equal to 0.01%, and all other impurities less than or equal to 0.03%.

At block 904, the method includes placing the container in a gamma-ray shield of the present disclosure. In at least one example, the gamma-ray shield is a gamma-ray shield of FIG. 4. In at least one example, the gamma-ray shield is an equivalent of a gamma-ray shield of FIG. 4.

At block 906, the method includes positioning the distal end of the gamma-ray attenuator of the gamma-ray shield relative to a gamma-ray spectrometry detector. Non-limiting examples of suitable gamma-ray spectrometry detectors include scintillation detectors and HPGe detectors. The distance between the distal end of the radiation safe and the gamma spectrometry detector's surface may vary depending upon the amount or radiation reaching the detector's surface. In one example, a suitable distance between an HPGe detector's surface and the distal end of a gamma-ray attenuator of FIG. 4 is about 10 cm. The distance may be decreased as needed if a composition comprises less than about 4,000 µCi of total radioactivity, and increased if a composition comprises more than about 20,000 µCi of total radioactivity. The distance may be similarly adjusted if a gamma-ray shield provides less attenuation than the gamma ray shield of FIG. 4.

At block 908, the method includes counting the radioactivity emitted from the sample. The method can include counting the radioactivity emitted from the sample for a sufficient amount of time or until a sufficient number of counts are obtained. In one example, counting occurs until spectrum gamma peaks are significantly above background. "Significantly above background" may be 3 standard deviations above background. In one example, the sufficient amount of time can be a predetermined amount of time. The predetermined amount of time can be according to a standard. The predetermined amount of time for a composition comprising about 4,000 µCi to about 20,000 µCi of total radioactivity can be for at least about 5 minutes, at least about 10 minutes, at least about 15 minutes, or more. In one example, the sufficient amount of counts can be a predetermined number of counts. The predetermined number of counts can be according to a standard.

At block 910, the method includes identifying Xe-133. In at least one example, the identification of Xe-133 is performed by analyzing major photo peaks at about 31.0 keV and about 81.0 keV. In at least one example, these peaks should be found within about 1.0 keV of these energies.

At block 912, the method includes positioning the distal end of a radiation safe of a gamma-ray shield relative to a gamma-ray spectrometry detector. Non-limiting examples of suitable gamma-ray spectrometry detectors include scintillation detectors and HPGe detectors. The distance between the distal end of the radiation safe and the gamma spectrometry detector's surface may vary depending upon the amount or radiation reaching the detector's surface. In one example, a suitable distance between an HPGe detector's surface and the distal end of a radiation shield of FIG. 4 is about 10 cm. The distance may be decreased as needed if a composition comprises less than about 4,000 µCi of total radioactivity, and increased if a composition comprises more than about 20,000 µCi of total radioactivity. The distance may be similarly adjusted if a gamma-ray shield provides less or more attenuation than the gamma ray shield of FIG. 4.

At block 914, the method includes counting the radioactivity emitted from the sample for a sufficient amount of time. The method can include counting the radioactivity emitted from the sample for a sufficient amount of time or until a sufficient number of counts are obtained. In one example, the sufficient amount of time can be a predetermined amount of time. The predetermined amount of time can be according to a standard. The predetermined amount of time for a composition comprising about 4,000 μCi to about 20,000 μCi of total radioactivity can be for at least about 20 minutes, at least about 30 minutes, at least about 45 minutes, at least about 60 minutes, or more. In one example, the sufficient amount of counts can be a predetermined number of counts. The predetermined number of counts can be according to a standard.

At block 916, the method includes identifying radionuclidic impurities by their known gamma energies.

At block 918, the method includes calculating a radionuclidic purity measurement. In at least example, radionuclidic purity is calculated as the ratio, expressed as a percentage, of the radioactivity of the desired radionuclide to the total radioactivity of the composition. In at least one example, radionuclidic impurity is calculated as the ratio, expressed as a percentage, of the total radioactivity for all radionuclidic impurities to the total radioactivity of the composition. In at least one example, radionuclidic impurity is calculated as the ratio, expressed as a percentage, of the total radioactivity for a specific radionuclidic impurity, or a subset of radionuclidic impurities, to the total radioactivity of the composition. In one example, the specific radionuclidic impurity can be Xe-133m, Xe-131m, Kr-85, or I-131. In another example, the specific radionuclidic impurity can be Kr-85, Xe-131m, Xe-133m, I-131, Cs-137, Ba-140, or Zr-95. In one example, the subset of radionuclidic impurities can include all detected radioxenon impurities. In another example, the subset of radionuclidic impurities can include all detected radioactive impurities excluding radioxenon impurities. In another example, the subset of radionuclidic impurities can include all detected radioactive impurities excluding Xe-133m, Xe-131m, Kr-85, and I-131.

Figure 10:
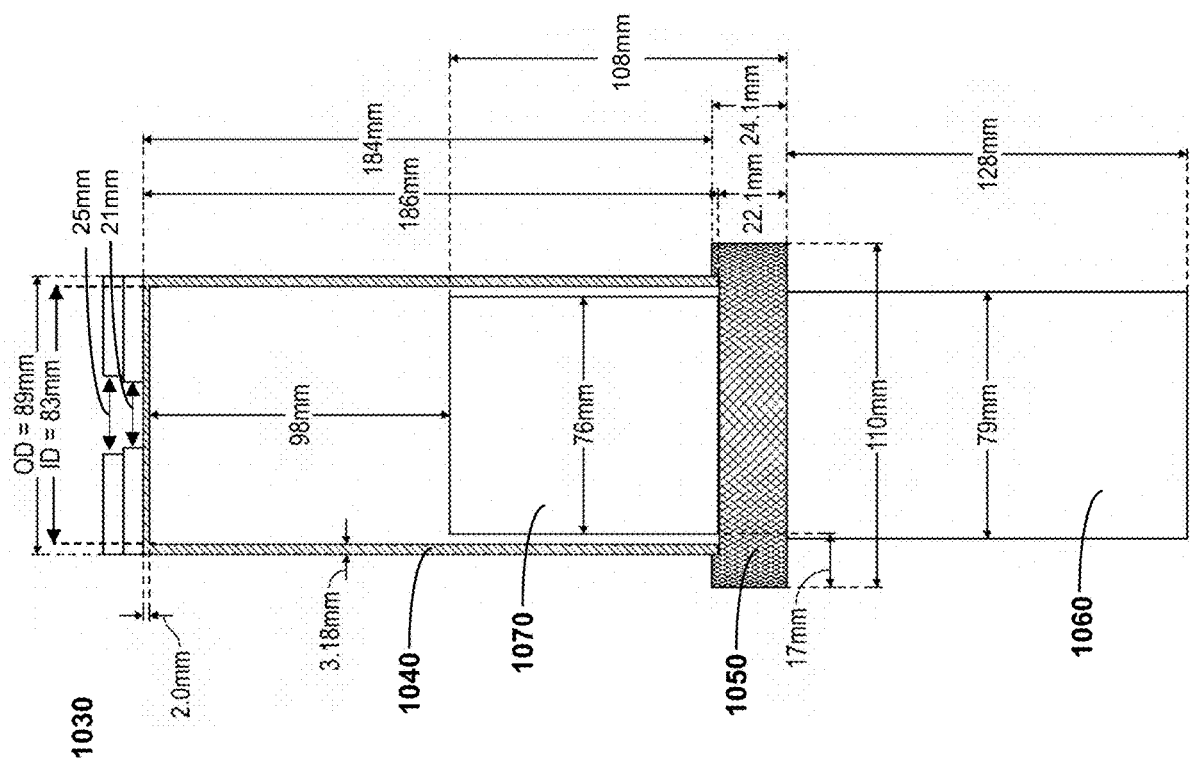
FIG. 10 is schematic cross-sectional view of a gamma-ray detector platform according to the present disclosure.

FIG. 10 is schematic cross-sectional view of a gamma-ray detector platform according to the present disclosure. Removable plexiglass platform attachment 1030 sits on plexiglass platform 1040. In this example, plexiglass platform attachment 1030 has two pieces, each about 6.35 mm thick; and plexiglass platform 1040 is a hollow plexiglass tube with an outer diameter of about 89 mm, an inner diameter of about 83 mm, and a wall that is about 3.2 mm. Plexiglass platform 1040 sits in a depression in platform base 1050. In this example, platform base 1050 is a Delron ring that has a center hole adjustable from about 76 mm to about 77 mm and a thickness of about 17 mm. The depression in platform base 1050 is about 2 mm, and the depression has a diameter of about 90 mm. Platform base 1050 sits on top of the detector's pre-amp housing 1060. In this example, the height of pre-amp housing 1060 is 128 mm. The detector's housing end cap 1070 extends into the plexiglass platform 1040. In this example, the height of the housing end cap 1070 is 108 mm. As illustrated a gamma-ray detector platform can be configured to hold the detector a predetermined distance away from the sample. In this example, the distance from the plexiglass platform 1040 surface to the detector end cap window is 100 mm (98 mm+2.0 mm).

Figure 11:
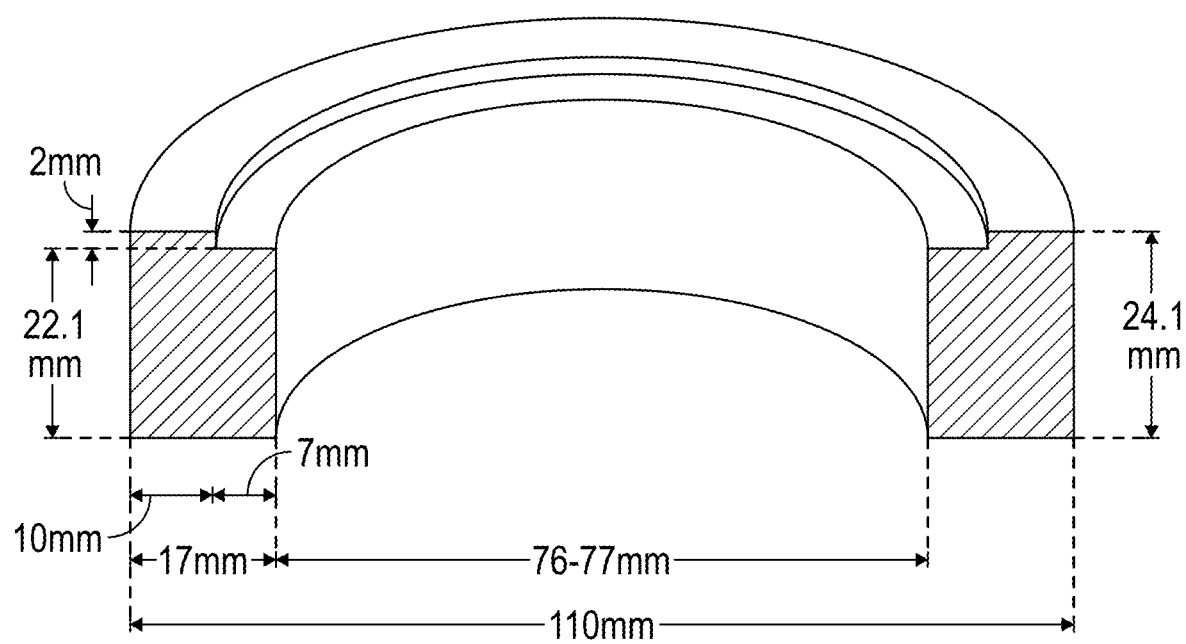
FIG. 11 is a schematic partial cross-sectional view of a gamma-ray detector platform base according to the present disclosure.

FIG. 11 is a schematic partial cross-sectional view of a gamma-ray detector platform base according to the present disclosure. The gamma-ray detector platform base can be a part of the gamma-ray detector platform of FIG. 10.

Figure 12A:
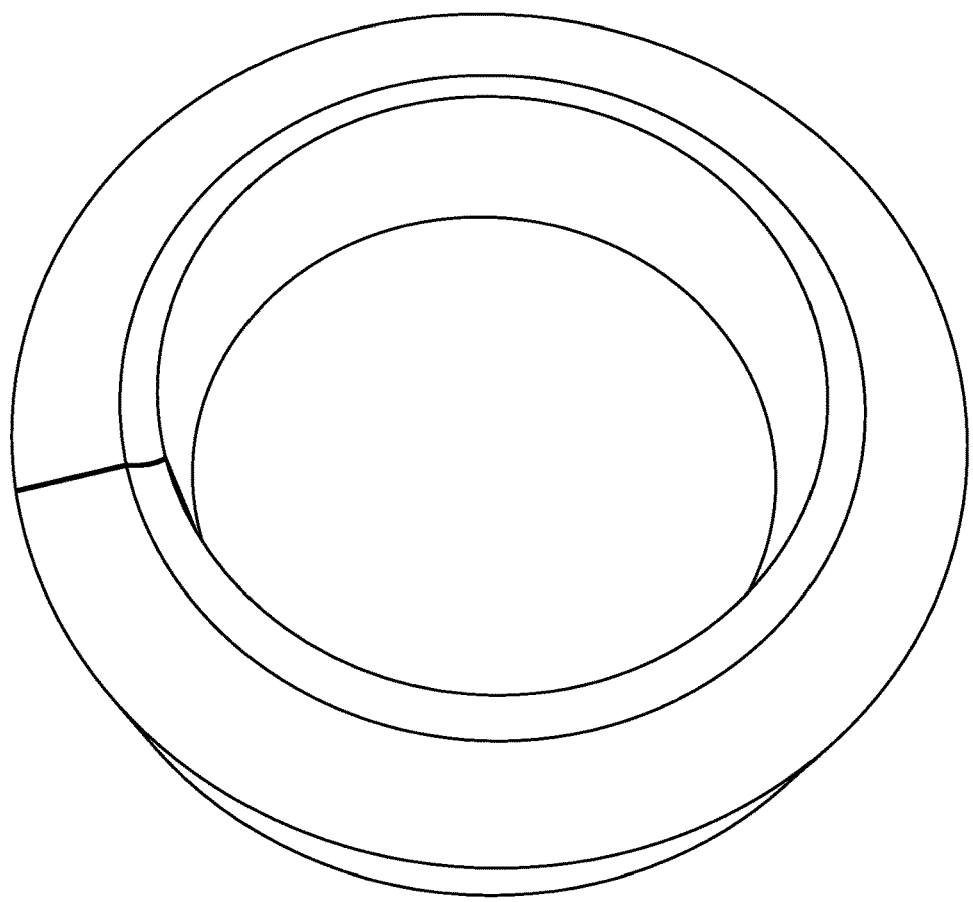
FIG. 12A is a picture of a bottom view of a gamma-ray detector platform base according to the present disclosure.

FIG. 12A is a picture of a bottom view of a gamma-ray detector platform base according to the present disclosure. The bottom of the gamma-ray detector platform base is configured to be substantially flat so that it can rest on a surface.

Figure 12B:
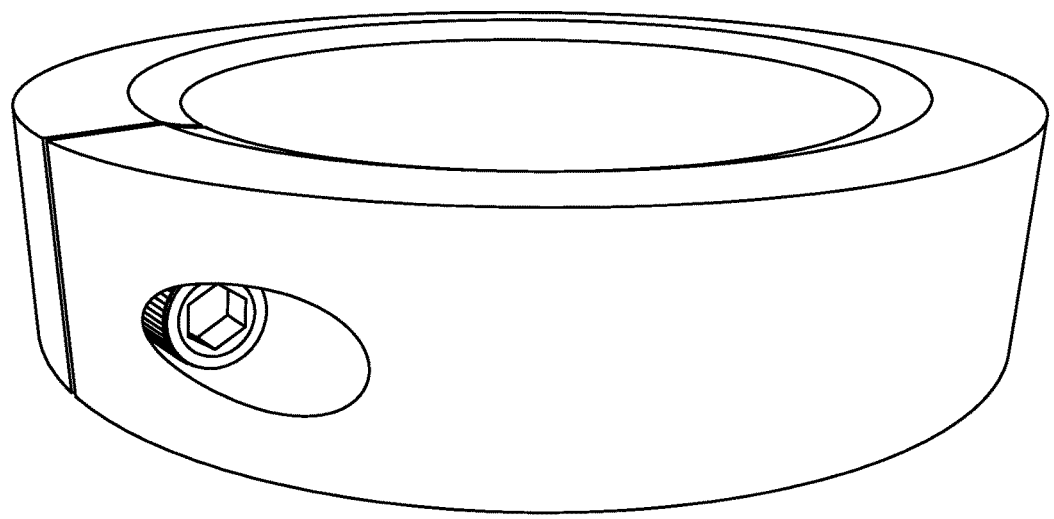
FIG. 12B is a picture of a side elevation view of a gamma-ray detector platform base according to the present disclosure.

FIG. 12B is a picture of a side elevation view of a gamma-ray detector platform base according to the present disclosure. As illustrated in FIG. 12B, the gamma-ray detector platform base includes a fastener. The fastener as illustrated can be a screw or bolt. The fastener can allow the gamma-ray detector platform to be secured and adjusted.

Figure 12C:
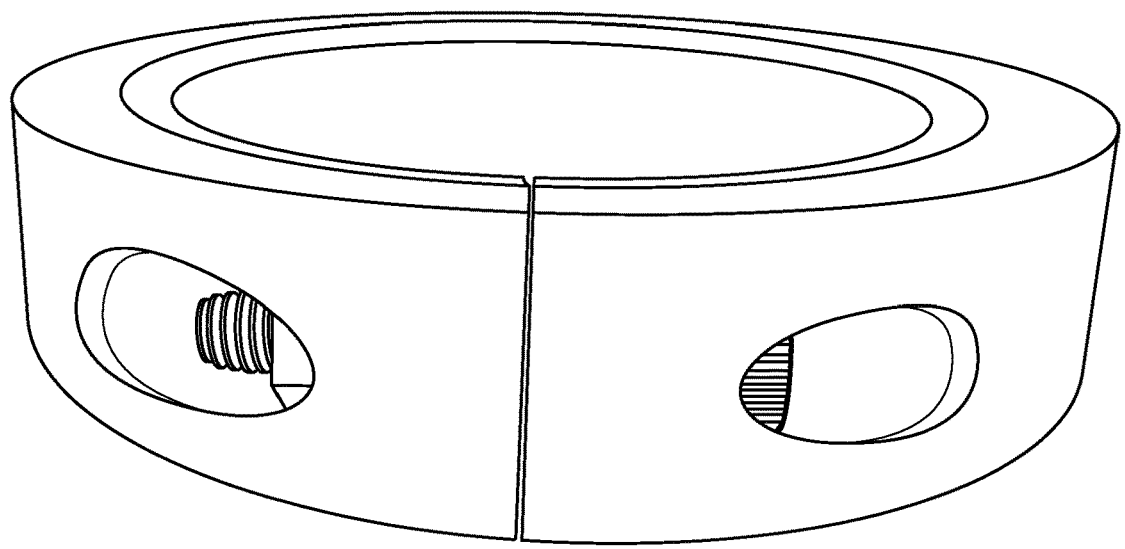
FIG. 12C is a picture of another side elevation view of a gamma-ray detector platform base according to the present disclosure.

FIG. 12C is a picture of another side elevation view of a gamma-ray detector platform base according to the present disclosure. As illustrated in FIG. 12C, the fastener is a bolt and a nut.

Figure 12D:
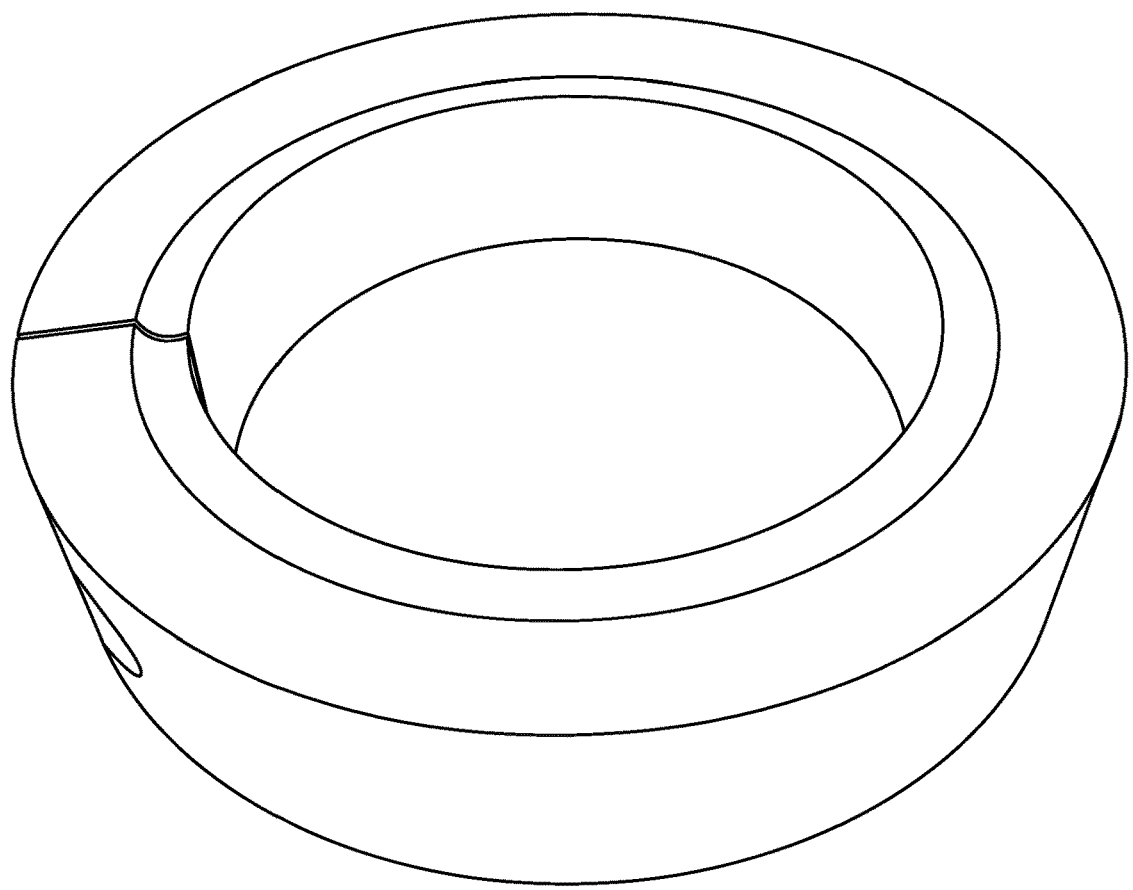
FIG. 12D is a picture of top view of a gamma-ray detector platform base according to the present disclosure.

FIG. 12D is a picture of top view of a gamma-ray detector platform base according to the present disclosure. As illustrated in FIG. 12D, the gamma-ray detector platform can include a recess that is formed therein. The recess can be in the form of a groove that is configured to receive the platform as further illustrated in FIG. 11.

Statement Bank:

Statement 1: A gamma-ray attenuator comprising: a sleeve having a wall, a distal end, and a proximal end, wherein the distal end being closed and the proximal end forming an opening; a copper insert operable to be installed within the opening, wherein the copper insert has a substantially uniform thickness, measured along an axial direction of the sleeve; a tin insert substantially abutting the copper insert on a side of the copper insert opposite the sleeve, wherein the tin insert has a substantially uniform thickness, measured along an axial direction of the sleeve; a tungsten insert substantially abutting the tin insert, wherein the tungsten insert has a thickness, measured along an axial direction of the cylindrical sleeve, that is substantially uniform or that has a thinner edge than a midpoint; wherein the copper insert, the tin insert, and the tungsten insert each have at least one through hole formed therethrough and are operable to be aligned with each other, the through hole(s) for each insert having a total diameter of about 1 millimeter to about 2 millimeters.

Statement 2: The gamma-ray attenuator of Statement 1, wherein the copper insert has a thickness of about 0.9 millimeters to about 1.1 millimeters, optionally about 0.95 millimeters to about 1.05 millimeters; the tin insert has a thickness of about 1.0 millimeter to about 1.7 millimeters, optionally about 1.5 to about 1.6 millimeters; the tungsten insert has a thickness of about 0.9 millimeters to about 1.1 millimeters, optionally about 0.95 to about 1.05 millimeters.

Statement 3: The gamma-ray attenuator of Statement 1, wherein the copper insert has a thickness of about 1.02 millimeters; the tin insert has a thickness of about 1.55 millimeters; and the tungsten insert has a thickness of about 1.02 millimeters.

Statement 4: The gamma-ray attenuator of any one of the preceding Statements, wherein the wall of the cylindrical sleeve has a height of about 4 millimeters to about 16 millimeters measured in the axial direction of the sleeve.

Statement 5: The gamma-ray attenuator of Statement 4, wherein the wall of the cylindrical sleeve has a height of about 5 millimeters, about 7.5 millimeters, about 10 millimeters, about 12.5 millimeters, or about 15 millimeters measured in the axial direction of the cylindrical sleeve.

Statement 6: The gamma-ray attenuator of Statement 4, wherein the wall of the cylindrical sleeve has a height of 16.25 millimeters measured in the axial direction of the cylindrical sleeve.

Statement 7: The gamma-ray attenuator of any one of the preceding Statements, wherein the thickness of the wall of the sleeve is about 0.5 millimeters to about 5 millimeters.

Statement 8: The gamma-ray attenuator of Statement 7, wherein the thickness of the wall of the sleeve is about 1.5 millimeters, about 3 millimeters, or about 4.5 millimeters.

Statement 9: The gamma-ray attenuator of Statement 7, wherein the thickness of the wall of the sleeve is about 1.6 millimeters.

Statement 10: The gamma-ray attenuator of any one of the preceding Statements, wherein the diameter of each insert is equal to the inner diameter of the sleeve or is greater than the inner diameter of the sleeve by up to about 0.5 millimeters.

Statement 11: The gamma-ray attenuator of any one of the preceding Statements, wherein the diameter of each insert is about 20.5 millimeters.

Statement 12: The gamma-ray attenuator of any one of the preceding Statements, wherein the closed distal end of the sleeve has a thickness of about 0.5 millimeter, about 1 millimeter, about 1.5 millimeters, or about 2 millimeters.

Statement 13: The gamma-ray attenuator of Statement 12, wherein the closed distal end of the cylindrical sleeve has a thickness of about 1.60 millimeters.

Statement 14: The gamma-ray attenuator of any one of the preceding Statements, wherein the copper insert has a substantially uniform thickness, measured along an axial direction of the cylindrical sleeve, of 1.02 millimeters; the tin insert has a substantially uniform thickness, measured along an axial direction of the cylindrical sleeve, of 1.57 millimeters; the tungsten insert has a thickness, measured along an axial direction of the cylindrical sleeve, of 1.02 millimeters at a midpoint and about 0.52 millimeters at an edge; wherein the through hole(s) for each insert having a total diameter of about 1.20 millimeters to about 1.60 millimeters.

Statement 15: The gamma-ray attenuator of any one of the preceding Statements, wherein the closed distal end of the sleeve is integrally formed with the outer wall.

Statement 16: The gamma-ray attenuator of any one of the preceding Statements, wherein the inserts are removable from the sleeve.

Statement 17: The gamma-ray attenuator of any one of the preceding Statements, wherein the material of the sleeve is a rubber.

Statement 18: The gamma-ray attenuator of Statement 17, wherein the rubber is a natural rubber.

Statement 19: A gamma-ray shield comprising: a radiation safe comprising a wall, a distal end, a proximal end and a well, wherein the proximal end forming an opening to the well, the well extending along an axial direction of the radiation safe to the distal end of the radiation safe, and the distal end of the radiation safe being closed; and a gamma-ray attenuator of any one of the preceding Statements, wherein the gamma-ray attenuator is operable to receive the radiation safe.

Statement 20: The gamma-ray shield of Statement 19, wherein the closed distal end of the radiation safe has a thickness of about 0.7 millimeters to about 1.3 millimeters, optionally about 0.9 millimeters to about 1.1 millimeters.

Statement 21: The gamma-ray shield of Statement 19, wherein the closed distal end of the radiation safe has a thickness of about 0.9 millimeters to about 1.0 millimeter.

Statement 22: The gamma-ray shield of Statement 19, 20 or 21, wherein the closed distal end of the radiation safe has an average thickness of about 0.90 millimeters to about 0.95 millimeters.

Statement 23: The gamma-ray shield of Statement 19, 20 or 21, wherein the closed distal end of the radiation safe has an average thickness of 0.90 millimeters, 0.91 millimeters, 0.92 millimeters, 0.93 millimeters, 0.94 millimeters, or 0.95 millimeters.

Statement 24: The gamma-ray shield of one of Statements 19 to 23 wherein the closed distal end of the radiation safe has a thickness, measured at the midpoint, of about 1.0 millimeter.

Statement 25: The gamma-ray shield of any one of Statements 19 to 24, wherein the closed distal end of the radiation safe is integrally formed with the wall of the radiation safe.

Statement 26: The gamma-ray shield of any one of Statements 19 to 25, wherein the wall of the radiation safe has a thickness of about 2 millimeters to about 3 millimeters, optionally about 2.5 millimeters to 3.0 millimeters.

Statement 27: The gamma-ray shield of Statement 26, wherein the wall of the radiation safe has a thickness of about 2.73 millimeters to about 2.77 millimeters.

Statement 28: The gamma-ray shield of any one of Statements 19 to 27, wherein the radiation safe is comprised of tungsten.

Statement 29: The gamma-ray shield of any one of Statements 19 to 27, wherein the radiation safe is a pure tungsten.

Statement 30: The gamma-ray shield of any one of Statements 19 to 27, wherein the radiation safe is a tungsten alloy.

Statement 31: The gamma-ray shield of any one of Statements 19 to 30, wherein the radiation safe is operable to receive a container in the well.

Statement 32: The gamma-ray shield of Statement 31, wherein the outer diameter of the radiation safe is equal to the inner diameter of the sleeve.

Statement 33: The gamma-ray shield of any one of Statements 28 to 32, wherein the inner diameter of the radiation safe is about 10 millimeters to about 20 millimeters and the wall of the radiation safe has a height, measured in the axial direction of the radiation safe, of about 30 millimeters to about 40 millimeters.

Statement 34: The gamma-ray shield of Statement 33, wherein the inner diameter of the radiation safe is at least about 14.49 millimeters and the wall of the radiation safe has a height, measured in the axial direction of the radiation safe, of about 36.60 millimeters.

Statement 35: The gamma-ray shield of any one of Statements 19 to 34 further comprising a container in the well of the radiation safe.

Statement 36: A system comprising: a gamma-ray shield of Statement 34; and a gamma spectroscopy detector; wherein the gamma-ray shield is positioned at a suitable distance from the detector's surface, measured either from the distal end of the gamma-ray attenuator and the through holes of the copper, tin and tungsten inserts are aligned with the detector or from the distal end of the safe; and wherein the container in the well of the tungsten cylinder comprises a radionuclide composition.

Statement 37. The system of Statement 36, wherein the gamma spectroscopy detector is a scintillation detector.

Statement 38: The system of Statement 36, wherein the gamma spectroscopy detector is a high purity germanium detector.

Statement 39: The system of any one of Statements 36 to 38, wherein the radionuclide composition comprises xenon-133 and optionally one or more diluent.

Statement 40: The system of Statement 39, wherein the radionuclide composition comprises at least about 2 microcuries of total radioactivity.

Statement 41: The system of Statement 39, wherein the radionuclide composition comprises at least 4,000 microcuries of total radioactivity.

Statement 42: The system of Statement 39, wherein the radionuclide composition comprises about 4,000 microcuries to about 20,000 microcuries of total radioactivity, about 20,000 microcuries to about 40,000 microcuries of total radioactivity, about 40,000 microcuries to about 80,000 microcuries of total radioactivity, about 60,000 microcuries to about 100,000 microcuries of total radioactivity.

Statement 43: The system of any one of Statement 41 to 42, wherein the gamma spectroscopy detector is a high purity germanium detector and the distance is about 10 cm.

Statement 44: The system of any one of Statements 36 to 42, wherein the radionuclide composition further comprises at least one radionuclidic impurity.

Statement 45: The system of Statement 44, wherein the radionuclidic impurity is xenon-133m, xenon-131m, krypton-85, iodine-131, caesium-137, barium-140, and zirconium-95, or any combination thereof.

Statement 46: The system of Statement 44 or 45, wherein the radionuclidic impurity in the composition is 5% or less.

Statement 47: The system of Statement 46, wherein the radionuclidic impurity in the composition is 2% or less.

Statement 48: The system of Statement 47, wherein the radionuclidic impurity in the composition is 1.7% or less.

Statement 49: The system of any one of Statements 46 to 47, wherein the radioxenon impurity in the composition is 1.6% or less.

Statement 50: The system of any one of Statements 48 to 49, wherein all non-radioxenon impurities in the composition are 0.1% or less.

Statement 51: The system of Statement 50, wherein there is less than or equal to 0.03% Kr-85, less than or equal to 0.01% I-131, and less than or equal to 0.06% for all other impurities.

Statement 52: The system of Statement 50, wherein there is less than or equal to 0.03% Kr-85, less than or equal to 0.01% I-131, and less than or equal to 0.03% for all other impurities.

Statement 53: Use of a gamma-ray shield of any one of Statements 19 to 35 for the identification of one or more radionuclides in a composition.

Statement 54: Use of a gamma-ray shield of any one of Statements 19 to 35 for the identification and/or measurement of one or more radionuclidic impurities in a composition comprising xenon-133.

Statement 55: Use of a gamma-ray shield of any one of Statements 19 to 35 for the identification and/or measurement of one or more radionuclidic impurity in a composition comprising xenon-133, wherein the radionuclidic impurity is xenon-133m, xenon-131m, krypton-85, iodine-131, caesium-137, barium-140, and zirconium-95, or any combination thereof.

Statement 56: Use of a system of any one of Statements 36 to 52 for the identification of one or more radionuclides in a composition.

Statement 57: Use of a system of any one of Statements 36 to 52 for the identification of one or more radionuclidic impurities in a composition comprising xenon-133.

Statement 58: Use of a system of any one of Statements 36 to 52 for the identification of one or more radionuclidic impurity in a composition comprising xenon-133, wherein the radionuclidic impurity is xenon-133m, xenon-131m, krypton-85, iodine-131, caesium-137, barium-140, and zirconium-95, or any combination thereof.

Statement 59: A method for radionuclide identification comprising: providing a container comprising a composition comprising Xe-133; placing the container in a gamma-ray shield of the present disclosure, optionally a gamma-ray shield of any one of Statements 19 to 35; positioning the gamma-ray shield such that the distal end of the gamma-ray attenuator is a predetermined distance from a gamma spectrometry detector's surface; counting the radioactivity emitted from the sample for a sufficient amount of time or a sufficient number of counts; and identifying Xe-133 by its major photo peaks at about 31.0 keV and about 81.0 keV.

Statement 60: A method for radionuclide identification comprising: providing a container comprising a composition comprising Xe-133, wherein the composition comprises about 4,000 to about 20,000 µCi of total radioactivity; placing the container in a gamma-ray shield of the present disclosure, optionally a gamma-ray shield of any one of Statements 19 to 35; positioning the gamma-ray shield such that the distal end of the gamma-ray attenuator is about 10 cm from a gamma spectrometry detector's surface; counting the radioactivity emitted from the sample for a sufficient amount of time or a sufficient number of counts; and identifying Xe-133 by its major photo peaks at about 31.0 keV and about 81.0 keV.

Statement 61: A method for radionuclidic purity measurement comprising: providing a container comprising a composition with a known amount of radioactivity, wherein the composition comprises Xe-133; placing the container in a gamma-ray shield of the present disclosure, optionally a gamma-ray shield of any one of Statements 19 to 35; positioning the gamma-ray shield such that the distal end of the safe is a predetermined distance from a gamma spectrometry detector's surface; counting the radioactivity emitted from the sample for a sufficient amount of time or a sufficient number of counts; identifying radionuclidic impurities by their known gamma energies; and calculating percent impurity and/or radionuclidic purity.

Statement 62: A method for radionuclide identification and radionuclidic purity measurement comprising: providing a container comprising a composition comprising Xe-133 and optionally one or more diluent, wherein the composition comprises about 4,000 to about 20,000 µCi of total radioactivity; placing the container in a gamma-ray shield as recited in any one of Statements 19 to 35; positioning the gamma-ray shield such that the distal end of the gamma-ray attenuator is about 10 cm from a gamma spectrometry detector's surface; counting the radioactivity emitted from the sample for a sufficient amount of time or a sufficient number of counts; identifying Xe-133 by its major photo peaks at about 31.0 keV and about 81.0 keV; repositioning the gamma-ray shield such that the distal end of the radiation safe is about 10 cm from a gamma spectrometry detector's surface; counting the radioactivity emitted from the sample for a sufficient amount of time or a sufficient number of counts; and identifying radionuclidic impurities by their known gamma energies; and calculating a radionuclidic purity measurement.

EXAMPLES

The following examples are included to demonstrate preferred examples of the disclosure. It should be appreciated by those of skill in the art that the techniques disclosed in the examples that follow represent techniques discovered by the inventors to function well in the practice of the disclosure. Those of skill in the art should, however, in light of the present disclosure, appreciate that changes may be made in the specific examples that are disclosed and still obtain a like or similar result without departing from the spirit and scope of the disclosure. Therefore, all matter set forth or shown in the accompanying drawings is to be interpreted as illustrative and not in a limiting sense.

Example 1

Radionuclide identification was performed using a Canberra Extended Range High Purity Germanium detector coupled with a DSA1000 Multichannel Analyzer. A gamma-ray shield of FIG. 4, a sample platform attachment, and a Xe-133 sample 4-20 mCi of total radioactivity was obtained. A sample platform attachment is placed over the surface of the sample platform (FIG. 3D). The Xe-133 sample is placed into the tungsten safe and the gamma-ray attenuator is fitted over safe (FIG. 3C). The gamma-ray shield is positioned on the gamma detector sample platform such that the gamma-ray attenuator fits into the center hole of the platform attachment (FIG. 3A). The sample is counted for a minimum of 500 seconds and analyzed using the Apex Gamma software (Canberra). Identification of Xe-133 is confirmed by its major photo peaks at 31.0 and 81.0 keV.

Example 2

Radionuclidic purity was measured using a Canberra Extended Range High Purity Germanium detector coupled with a DSA1000 Multichannel Analyzer. A gamma-ray shield of FIG. 4, a sample platform attachment, and a Xe-133 sample 4-20 mCi of total radioactivity was obtained. A sample platform attachment is placed over the surface of the sample platform (FIG. 3D). The Xe-133 sample is placed into the tungsten safe and the gamma-ray attenuator is fitted over safe (FIG. 3C). The gamma-ray shield is positioned on the gamma detector sample platform such that the safe bottom rests directly on the sample platform surface (FIG. 3B). The sample is counted for a minimum of 1800 seconds and analyzed using the Apex Gamma software (Canberra). If any gamma impurities are detected, including Xe-131m or Xe-133m, calculate the percent of each impurity as follows:
% Impurity=(radionuclide impurity μCi/vial/counting vial activity mCi/vial)×(1 mCi/1000 μCi)×100%.

Example 3

Radionuclide identification was performed using a Canberra Extended Range High Purity Germanium detector coupled with a DSA1000 Multichannel Analyzer. A gamma-ray shield of FIG. 4, a sample platform attachment, and a Xe-133 sample 4-20 mCi of total radioactivity was obtained. A sample platform attachment is placed over the surface of the sample platform (FIG. 3D). The Xe-133 sample is placed into the tungsten safe and the gamma-ray attenuator is fitted over safe (FIG. 3C). The gamma-ray shield is positioned on the gamma detector sample platform such that the gamma-ray attenuator fits into the center hole of the platform attachment (FIG. 3A). The sample is counted for a minimum of 500 seconds and analyzed using the Apex Gamma software (Canberra). Identification of Xe-133 is confirmed by its major photo peaks at 31.0 and 81.0 keV. The gamma-ray shield is then inverted such that the safe bottom rests directly on the sample platform surface (FIG. 3B). The sample is counted for a minimum of 1800 seconds and analyzed using the Apex Gamma software (Canberra). If any gamma impurities are detected, including Xe-131m or Xe-133m, calculate the percent of each impurity as follows: % Impurity=(radionuclide impurity μCi/vial/counting vial activity mCi/vial)×(1 mCi/1000 μCi)×100%.

What is claimed is:

1. A gamma-ray shield comprising:
a radiation safe comprising a wall, a distal end, a proximal end and a well, wherein the proximal end forming an opening to the well, the well extending along an axial direction of the radiation safe to the distal end of the radiation safe, and the distal end of the radiation safe being closed; and
a gamma-ray attenuator operable to receive the radiation safe, wherein the gamma-ray attenuator comprises
a sleeve having a wall, a distal end, and a proximal end, wherein the distal end being closed and the proximal end forming an opening;
a copper insert operable to be installed within the opening, wherein the copper insert has a substantially uniform thickness, measured along an axial direction of the sleeve;
a tin insert substantially abutting the copper insert on a side of the copper insert opposite the sleeve, wherein the tin insert has a substantially uniform thickness, measured along an axial direction of the sleeve;
a tungsten insert substantially abutting the tin insert, wherein the tungsten insert has a substantially uniform thickness or a thickness that is thinner at an edge than at a midpoint, measured along an axial direction of the sleeve;
wherein the copper insert, the tin insert, and the tungsten insert each have at least one through hole formed therethrough and are operable to be aligned with each other.

2. The gamma-ray shield as recited in claim 1, wherein:
the copper insert has a thickness of about 0.9 millimeters to about 1.1 millimeters, and the through hole(s) have a total diameter of about 1 millimeter to about 2 millimeters;
the tin insert has a thickness of about 1.0 millimeter to about 1.7 millimeters, and the through hole(s) have a total diameter of about 1 millimeter to about 2 millimeters; and
the tungsten insert has a thickness of about 0.9 millimeters to about 1.1 millimeters, and the through hole(s) have a total diameter of about 1 millimeter to about 2 millimeters.

3. The gamma-ray shield as recited in claim 2, wherein:
the copper insert has a thickness of about 0.95 millimeters to about 1.05 millimeters, and the through hole(s) have a total diameter of about 1 millimeter to about 2 millimeters;
the tin insert has a thickness of about 1.5 to about 1.6 millimeters, and the through hole(s) have a total diameter of about 1 millimeter to about 2 millimeters;
the tungsten insert has a thickness of about 0.95 to about 1.05 millimeters, and the through hole(s) have a total diameter of about 1 millimeter to about 2 millimeters.

4. The gamma-ray shield as recited in claim 2, wherein:
the copper insert has a thickness of about 1.0 millimeter, and the through hole(s) have a total diameter of about 1 millimeter to about 2 millimeters;
the tin insert has a thickness of about 1.55 millimeters, and the through hole(s) have a total diameter of about 1 millimeter to about 2 millimeters; and
the tungsten insert has a thickness of about 1.0 millimeter, and the through hole(s) have a total diameter of about 1 millimeter to about 2 millimeters.

5. The gamma-ray shield as recited in claim 2, wherein the through hole(s) for each insert has a total diameter of about 1.2 millimeters to about 1.6 millimeters.

6. The gamma-ray shield as recited in claim 1, wherein the wall of the sleeve has a height of about 4 millimeters to about 16 millimeters measured in the axial direction of the sleeve and/or the wall of the sleeve has a thickness of about 0.5 millimeters to about 5.0 millimeters.

7. The gamma-ray shield as recited in claim 1, wherein a diameter of each insert is equal to the inner diameter of the sleeve or greater than the inner diameter of the sleeve by about 0.5 millimeters.

8. The gamma-ray shield as recited in claim 1, wherein the diameter of each insert is about 20 millimeters.

9. The gamma-ray shield as recited in claim 1, wherein the sleeve is a rubber.

10. The gamma-ray shield as recited in claim 1, wherein the closed distal end of the sleeve is integrally formed with the wall.

11. The gamma-ray shield as recited in claim 1, wherein one or more of the copper insert, the tin insert, or the tungsten insert is removable from the sleeve.

12. The gamma-ray shield as recited in claim 1, wherein the closed distal end of the radiation safe has a thickness of about 0.9 millimeters to about 1.1 millimeters.

13. The gamma-ray shield as recited in claim 12, wherein the closed distal end of the radiation safe has an average thickness of about 0.9 millimeters.

14. The gamma-ray shield as recited in claim 12, wherein the closed distal end of the radiation safe has a thickness, measured at the midpoint, of about 1 millimeter.

15. The gamma-ray shield as recited in claim 1, wherein the closed distal end of the radiation safe is integrally formed with the wall of the radiation safe.

16. The gamma-ray shield as recited in claim 1, wherein the wall of the radiation safe has a thickness of about 2 millimeters to about 3 millimeters.

17. The gamma-ray shield as recited in claim 1, wherein the radiation safe is comprised of pure tungsten.

18. The gamma-ray shield as recited in claim 1, wherein an inner diameter of the radiation safe is about 10 millimeters to about 20 millimeters and the wall of the radiation safe has a height, measured in the axial direction of the radiation safe, of about 30 millimeters to about 40 millimeters.

19. The gamma-ray shield as recited in claim 18, wherein an inner diameter of the radiation safe is about 15 millimeters and the wall of the radiation safe has a height, measured in the axial direction of the radiation safe, of about 35 millimeters.

20. A system comprising:
a gamma-ray shield as recited in claim 1; and
a gamma spectroscopy detector;
wherein the gamma-ray shield is positioned at a distance of about 10 centimeters from the detector's surface, either measured from the distal end of the gamma-ray attenuator and the through holes of the copper, tin and tungsten inserts are aligned with the detector or measured from the distal end of the radiation safe; and
wherein the container in the well of the radiation safe comprises a composition comprising a radionuclide.

\* \* \* \* \*